United States Patent
Furusato et al.

(10) Patent No.: US 9,441,162 B2
(45) Date of Patent: Sep. 13, 2016

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yoshimasa Furusato, Chiba (JP); Masayuki Saito, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 0 days.

(21) Appl. No.: 14/692,732

(22) Filed: Apr. 21, 2015

(65) Prior Publication Data

US 2015/0337202 A1   Nov. 26, 2015

(30) Foreign Application Priority Data

May 26, 2014 (JP) .................. 2014-108149
Nov. 17, 2014 (JP) .................. 2014-232358

(51) Int. Cl.

| | |
|---|---|
| C09K 19/54 | (2006.01) |
| C09K 19/12 | (2006.01) |
| C09K 19/30 | (2006.01) |
| C09K 19/32 | (2006.01) |
| C09K 19/34 | (2006.01) |
| C09K 19/04 | (2006.01) |

(52) U.S. Cl.
CPC ....... *C09K 19/3483* (2013.01); *C09K 19/3066* (2013.01); *C09K 19/3068* (2013.01); *C09K 19/3098* (2013.01); *C09K 2019/0411* (2013.01); *C09K 2019/0448* (2013.01); *C09K 2019/122* (2013.01); *C09K 2019/123* (2013.01); *C09K 2019/301* (2013.01); *C09K 2019/3009* (2013.01); *C09K 2019/3016* (2013.01); *C09K 2019/3027* (2013.01); *C09K 2019/3036* (2013.01); *C09K 2019/3037* (2013.01); *C09K 2019/3422* (2013.01); *C09K 2019/3425* (2013.01); *C09K 2019/548* (2013.01)

(58) Field of Classification Search
CPC .......... C09K 19/3483; C09K 19/3066; C09K 19/3068; C09K 19/3098; C09K 2019/3425; C09K 2019/0448; C09K 2019/04111; C09K 2019/122; C09K 2019/123; C09K 2019/3009; C09K 2019/301; C09K 2019/3016; C09K 2019/3027; C09K 2019/3036; C09K 2019/3037; C09K 2019/3422; C09K 2019/548

See application file for complete search history.

(56) References Cited

U.S. PATENT DOCUMENTS

| | | | |
|---|---|---|---|
| 3,840,494 A | 10/1974 | Murayama et al. | |
| 8,999,460 B2 * | 4/2015 | Goebel | C09K 19/3483 252/299.01 |
| 2012/0268706 A1* | 10/2012 | Goebel | C09K 19/3483 349/143 |

FOREIGN PATENT DOCUMENTS

JP     47-027981     10/1972

* cited by examiner

*Primary Examiner* — Shean C Wu
(74) *Attorney, Agent, or Firm* — Jianq Chyun IP Office

(57) ABSTRACT

To provide a liquid crystal composition satisfying at least one or having a suitable balance regarding at least two of characteristics such as high maximum temperature of a nematic phase, low minimum temperature thereof, small viscosity, suitable optical anisotropy, large negative dielectric anisotropy, large specific resistance, high stability to ultraviolet light and heat; and an AM device having characteristics such as short response time, a large voltage holding ratio, low threshold voltage, a large contrast ratio and a long service life. A liquid crystal composition has negative dielectric anisotropy and a nematic phase, and contains a compound contributing to high stability to heat or ultraviolet light. The composition may contain a specific compound having large negative dielectric anisotropy as a first component, a specific compound having high maximum temperature or small viscosity as a second component, and a specific compound having a polymerizable group.

19 Claims, No Drawings

LIQUID CRYSTAL COMPOSITION AND LIQUID CRYSTAL DISPLAY DEVICE

CROSS-REFERENCE TO RELATED APPLICATIONS

This application claims the priority benefits of Japanese application serial no. 2014-108149, filed on May 26, 2014 and Japanese application serial no. 2014-232358, filed on Nov. 17, 2014. The entirety of each of the above-mentioned patent applications is hereby incorporated by reference herein and made a part of this specification.

TECHNICAL FIELD

The invention relates to a liquid crystal composition, a liquid crystal display device including the composition, and so forth. In particular, the invention relates to a liquid crystal composition having a negative dielectric anisotropy, and a liquid crystal display device including the composition and having such a mode as an IPS mode, a VA mode, an FFS mode and an FPA mode. The invention also relates to a liquid crystal display device having a polymer sustained alignment mode.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is further classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type according to a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving characteristics of the composition. Table 1 below summarizes a relationship between characteristics in two aspects. The characteristics of the composition will be further described based on a commercially available AM device. A temperature range of the nematic phase relates to a temperature range in which the device can be used. A preferred maximum temperature of the nematic phase is approximately 70° C. or higher and a preferred minimum temperature of the nematic phase is approximately −10° C. or lower. Viscosity of the composition relates to a response time in the device. A short response time is preferred for displaying moving images on the device. A shorter response time even by one millisecond is desirable. Accordingly, a small viscosity in the composition is preferred. A small viscosity at a low temperature is further preferred.

TABLE 1

Characteristics of Composition and AM Device

| No. | Characteristics of Composition | Characteristics of AM Device |
|---|---|---|
| 1 | Wide temperature range of a nematic phase | Wide usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |

An optical anisotropy of the composition relates to a contrast ratio in the device. According to the mode of the device, a large optical anisotropy or a small optical anisotropy, more specifically, a suitable optical anisotropy is required. A product (Δn×d) of the optical anisotropy (Δn) of the composition and a cell gap (d) in the device is designed so as to maximize the contrast ratio. A suitable value of the product depends on a kind of the operating mode. The value is in the range of approximately 0.30 micrometer to approximately 0.40 micrometer in a device having the VA mode, and in the range of approximately 0.20 micrometer to approximately 0.30 micrometer in a device having the FFS mode. In the above case, a composition having a large optical anisotropy is preferred for a device having a small cell gap. A large dielectric anisotropy in the composition contributes to a low threshold voltage, a small electric power consumption and a large contrast ratio in the device. Accordingly, the large dielectric anisotropy is preferred. A large specific resistance in the composition contributes to a large voltage holding ratio and a large contrast ratio in the device. Accordingly, a composition having a large specific resistance at room temperature and also at a high temperature in an initial stage is preferred. A composition having a large specific resistance at room temperature and also at a high temperature even after the device has been used for a long period of time is preferred. Stability of the composition to ultraviolet light and heat relates to a service life of the device. In the case where the stability is high, the device has a long service life. Such characteristics are preferred for an AM device for use in a liquid crystal projector, a liquid crystal television and so forth.

A liquid crystal composition containing a polymer is used in a liquid crystal display device having a polymer sustained alignment (PSA) mode. First, a composition to which a small amount of polymerizable compound is added is injected into a device. Next, a composition is irradiated with ultraviolet light while voltage is being applied between substrates of the device. The polymerizable compound polymerizes and generates a polymer network structure in the composition. In the composition, alignment of liquid crystal molecules can be controlled by the polymer, and therefore response time of the device is shortened and image persistence is improved. Such an effect of the polymer can be expected for the device having a mode such as the TN mode, the ECB mode, the OCB mode, the IPS mode, the VA mode, the FFS mode or the FPA mode.

A composition having a positive dielectric anisotropy is used for an AM device having the TN mode. A composition having a negative dielectric anisotropy is used for an AM device having the VA mode. A composition having a positive or negative dielectric anisotropy is used for an AM device having the IPS mode or the FFS mode. A composition having a positive or negative dielectric anisotropy is used for an AM device having a polymer sustained alignment (PSA) mode. Compound (1) in the present application is disclosed in Patent literature No. 1 described below.

CITATION LIST

Patent Literature

Patent literature No. 1: JP S47-027981 A.

SUMMARY OF INVENTION

The invention concerns a liquid crystal composition that has a negative dielectric anisotropy and a nematic phase, and contains at least one compound selected from the group consisting of compounds represented by formula (1), and a liquid crystal display device including the composition:

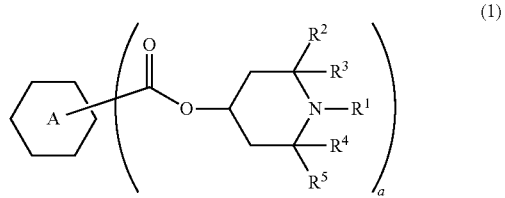

wherein, in formula (1), $R^1$ is hydrogen or alkyl having 1 to 15 carbons; $R^2$, $R^3$, $R^4$ and $R^5$ are independently hydrogen or alkyl having 1 to 4 carbons; ring A is phenyl or cyclohexyl; and a is 3 or 4.

The invention also concerns use of the liquid crystal composition in a liquid crystal display device having a polymer sustained alignment mode.

DESCRIPTION OF EMBODIMENTS

Technical Problem

One of the aims of the invention is to provide a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. Another aim is to provide a liquid crystal composition having a suitable balance regarding at least two of the characteristics. A further aim is to provide a liquid crystal display device including such a composition. An additional aim is an AM device having such characteristics as a short response time, a large voltage holding ratio, a low threshold voltage, a large contrast ratio and a long service life.

Solution to Problem

The invention concerns a liquid crystal composition that has a negative dielectric anisotropy and a nematic phase, and contains at least one compound selected from the group consisting of compounds represented by formula (1), and a liquid crystal display device including the composition:

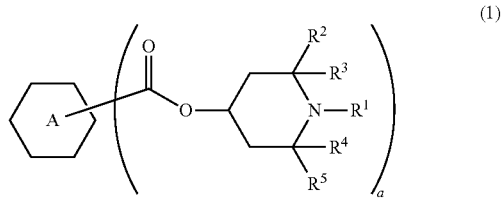

wherein, in formula (1), $R^1$ is hydrogen or alkyl having 1 to 15 carbons; $R^2$, $R^3$, $R^4$ and $R^5$ are independently hydrogen or alkyl having 1 to 4 carbons; ring A is phenyl or cyclohexyl; and a is 3 or 4.

The invention also concerns use of the liquid crystal composition in a liquid crystal display device having a polymer sustained alignment mode.

Advantageous Effects of Invention

An advantage of the invention is a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. Another advantage is a liquid crystal composition having a suitable balance regarding at least two of the characteristics. A further advantage is a liquid crystal display device including such a composition. An additional advantage is an AM device having such characteristics as a short response time, a large voltage holding ratio, a low threshold voltage, a large contrast ratio and a long service life.

Usage of terms herein is as described below. Terms "liquid crystal composition" and "liquid crystal display device" may be occasionally abbreviated as "composition" or "device," respectively. "Liquid crystal display device" is a generic term for a liquid crystal display panel and a liquid crystal display module. "Liquid crystal compound" is a generic term for a compound having a liquid crystal phase such as a nematic phase or a smectic phase, or a compound having no liquid crystal phase but being mixed with the composition for the purpose of adjusting characteristics such as a temperature range of the nematic phase, viscosity and dielectric anisotropy. The compound has a six-membered ring such as 1,4-cyclohexylene or 1,4-phenylene, and a rod-like molecular structure. "Polymerizable compound" is a compound added to form a polymer in the composition. At least one compound selected from the group consisting of compounds represented by formula (1) may be occasionally abbreviated as "compound (1)." "Compound (1)" means one compound, a mixture of two compounds or a mixture of three or more compounds represented by formula (1). A same rule applies to any other compound represented by any other formula.

The liquid crystal composition is prepared by mixing a plurality of liquid crystal compounds. A ratio (content) of the liquid crystal compound is expressed in terms of weight percentage (% by weight) based on the weight of the liquid crystal composition. An additive such as an optically active compound, an antioxidant, an ultraviolet light absorber, a dye, a defoaming agent, a polymerizable compound, a polymerization initiator or a polymerization inhibitor is added to the composition if needed. A ratio (an amount of addition) of the additive is expressed in terms of weight percentage (% by weight) based on the weight of the liquid crystal composition in a manner similar to the ratio of the liquid crystal compound. A weight part per million (ppm) may be used in several cases. A ratio of the polymerization initiator and the polymerization inhibitor is exceptionally expressed based on the weight of the polymerizable compound.

"Higher limit of a temperature range of the nematic phase" may be occasionally abbreviated as "maximum temperature." "Lower limit of the temperature range of the nematic phase" may be occasionally abbreviated as "minimum temperature." An expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. An expression "having a large voltage holding ratio" means that the device has a large voltage holding ratio at room temperature and also at a high temperature in an initial stage, and that the device has a large voltage holding ratio at room temperature and also at a temperature close to the maximum temperature of the nematic phase even after the device has been used for a long period of time. An expression "increase dielectric anisotropy" means that a dielectric anisotropy value increases positively in a composition having a positive dielectric anisotropy, and means that the dielectric anisotropy value increases negatively in a composition having a negative dielectric anisotropy.

An expression "at least one of 'A' may be replaced by 'B'" means that the number of 'A' is arbitrary. When the number of 'A' is one, a position of 'A' is arbitrary, and also when the number of 'A' is two or more, the positions thereof can be selected without a limit. A same rule also applies to an expression "at least one of 'A' is replaced by 'B'".

In formula (1) to formula (4), a symbol such as A, B or C surrounded by a hexagonal shape corresponds to ring A, ring B or ring C, respectively. In formula (4), an oblique line crossing the hexagon shape of ring G means that a bonding position on the ring can be arbitrarily selected for a $P^1$-$Sp^1$ group. A same rule applies to a $P^2$-$Sp^2$ group crossing ring I, or the like. A subscript such as f represents the number of groups bonding with ring G or the like. When f is 2, two $P^1$-$Sp^1$ groups exist on ring G. Two groups represented by $P^1$-$Sp^1$ may be identical or different. A same rule applies also to arbitrary two when f is larger than 2. A same rule also applies to other groups. The compound represented by formula (1) may be occasionally abbreviated as compound (1). The abbreviation is also applied to a compound represented by formula (2) or the like. Compound (1) means one compound or two or more compounds represented by formula (1). A symbol of a terminal group $R^6$ is used for a plurality of compounds in chemical formulas of component compounds. In the compounds, two groups represented by two arbitrary $R^6$ may be identical or different. In one case, for example, $R^6$ of compound (2-1) is ethyl and $R^6$ of compound (2-2) is ethyl. In another case, $R^6$ of compound (2-1) is ethyl and $R^6$ of compound (2-2) is propyl. A same rule applies to a symbol of any other terminal group or the like. When b is 2 in formula (2), two of ring B exist. In the compound, two rings represented by two of ring B may be identical or different. A same rule applies to two of arbitrary ring B when b is larger than 2. A same rule applies also to a symbol such as $Z^3$ and ring E.

Then, 2-fluoro-1,4-phenylene means two divalent groups described below. In the chemical formulas, fluorine may be leftward (L) or rightward (R). A same rule also applies to a divalent group of an asymmetrical ring, such as tetrahydropyran-2,5-diyl.

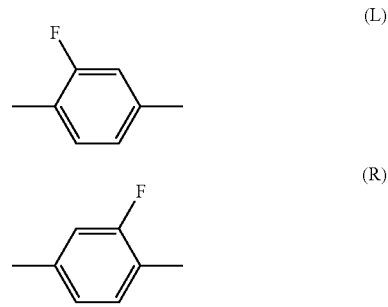

The invention includes the items described below.

Item 1. A liquid crystal composition that has a negative dielectric anisotropy and a nematic phase, and contains at least one compound selected from the group consisting of compounds represented by formula (1):

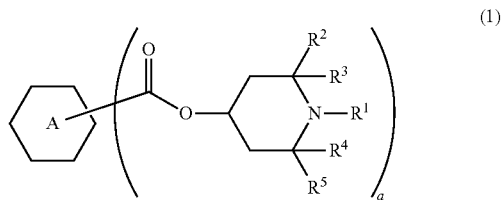

wherein, in formula (1), $R^1$ is hydrogen or alkyl having 1 to 15 carbons; $R^2$, $R^3$, $R^4$ and $R^5$ are independently hydrogen or alkyl having 1 to 4 carbons; ring A is phenyl or cyclohexyl; and a is 3 or 4.

Item 2. The liquid crystal composition according to item 1, containing at least one compound selected from the group consisting of compounds represented by formula (1-1) and formula (1-2):

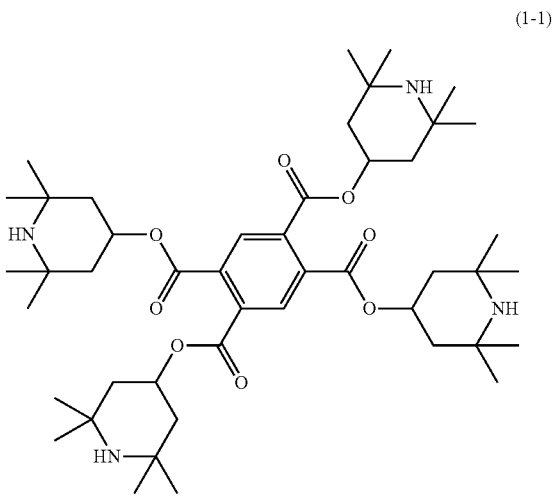

(1-2)

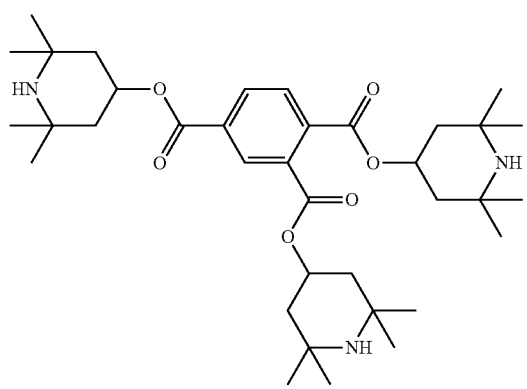

Item 3. The liquid crystal composition according to item 1, wherein a ratio of the compound represented by formula (1) is in the range of 0.005% by weight to 1% by weight based on the weight of the liquid crystal composition.

Item 4. The liquid crystal composition according to any one of items 1 to 3, containing at least one compound selected from the group consisting of compounds represented by formula (2) as a first component:

(2)

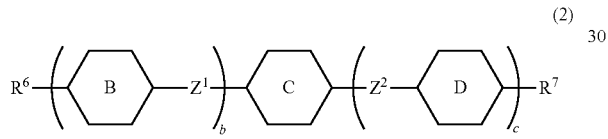

wherein, in formula (2), $R^6$ and $R^7$ are independently alkyl having 1 to 12 carbons, alkoxy having 1 to 12 carbons, alkenyl having 2 to 12 carbons or alkenyloxy having 2 to 12 carbons; ring B and ring D are independently 1,4-cyclohexylene, 1,4-cyclohexenylene, 1,4-phenylene, 1,4-phenylene in which at least one of hydrogen is replaced by fluorine or chlorine, or tetrahydropyran-2,5-diyl; ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^1$ and $Z^2$ are independently a single bond, ethylene, methyleneoxy or carbonyloxy; b is 1, 2 or 3 and c is 0 or 1; and a sum of b and c is 3 or less.

Item 5. The liquid crystal composition according to any one of items 1 to 4, containing at least one compound selected from the group consisting of compounds represented by formula (2-1) to formula (2-21) as the first component:

(2-1)

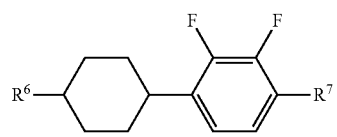

(2-2)

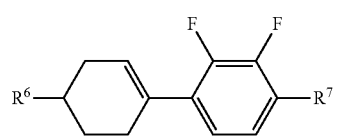

(2-3)

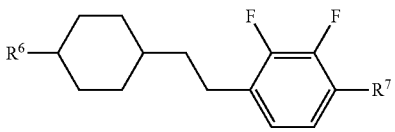

(2-4)

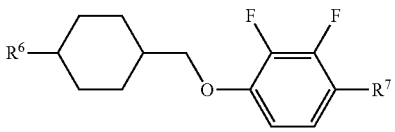

(2-5)

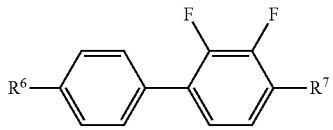

(2-6)

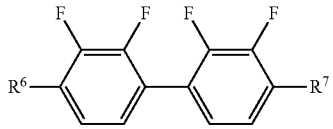

(2-7)

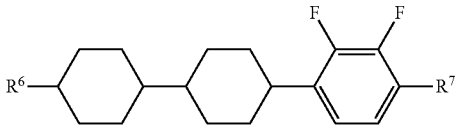

(2-8)

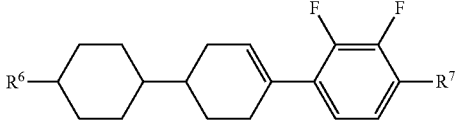

(2-9)

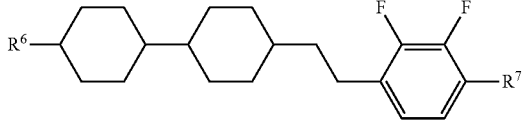

(2-10)

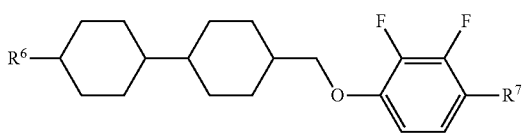

(2-11)

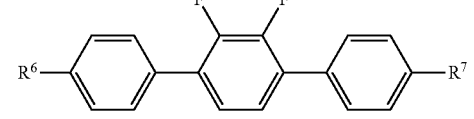

(2-12)

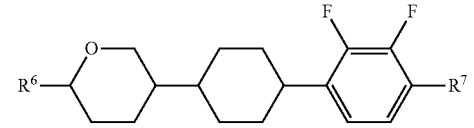

(2-13)

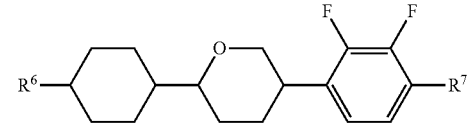

(2-14)
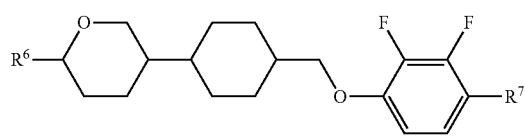

(2-15)
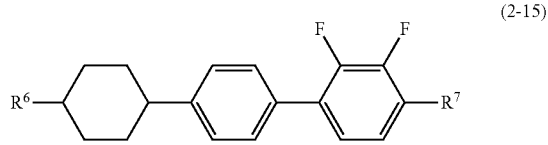

(2-16)
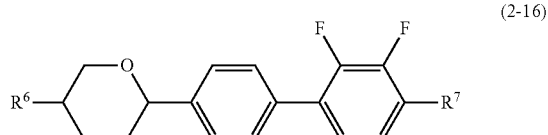

(2-17)
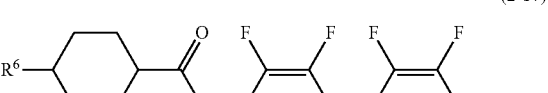

(2-18)
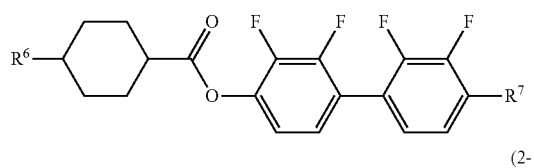

(2-19)
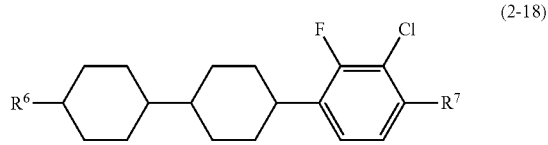

(2-20)
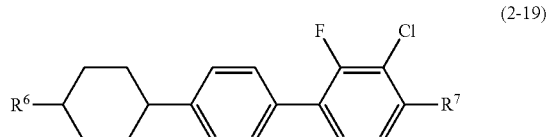

(2-21)
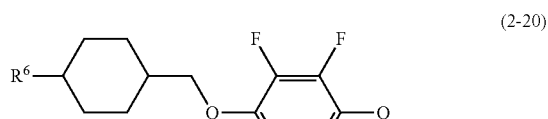

wherein, in formula (2-1) to formula (2-21), $R^6$ and $R^7$ are independently alkyl having 1 to 12 carbons, alkoxy having 1 to 12 carbons, alkenyl having 2 to 12 carbons or alkenyloxy having 2 to 12 carbons.

Item 6. The liquid crystal composition according to item 4 or 5, wherein a ratio of the first component is in the range of 10% by weight to 90% by weight based on the weight of the liquid crystal composition.

Item 7. The liquid crystal composition according to any one of items 1 to 6, containing at least one compound selected from the group consisting of compounds represented by formula (3) as a second component:

(3)
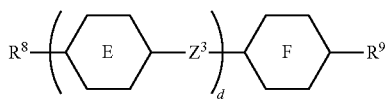

wherein, in formula (3), $R^8$ and $R^9$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring E and ring F are independently 1,4-cyclohexylene, 1,4-phenylene, 2-fluoro-1,4-phenylene or 2,5-difluoro-1,4-phenylene; $Z^3$ is a single bond, ethylene or carbonyloxy; and d is 1, 2 or 3.

Item 8. The liquid crystal composition according to any one of items 1 to 7, containing at least one compound selected from the group consisting of compounds represented by formula (3-1) to formula (3-13) as the second component:

(3-1)
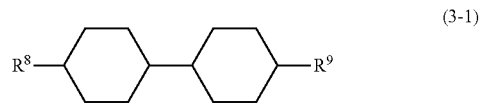

(3-2)
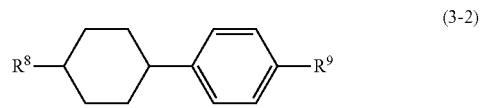

(3-3)
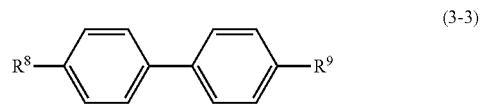

(3-4)
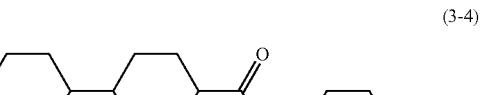

(3-5)
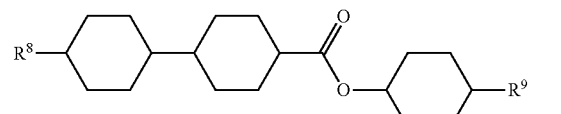

(3-6)
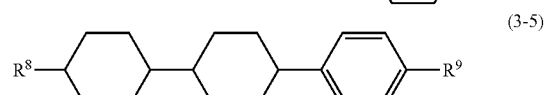

(3-7)
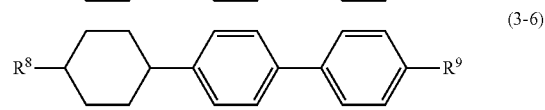

(3-8)

(3-9)
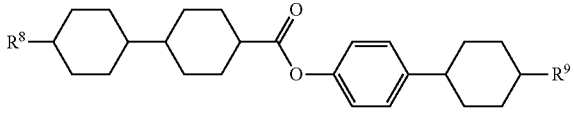

-continued (3-10)
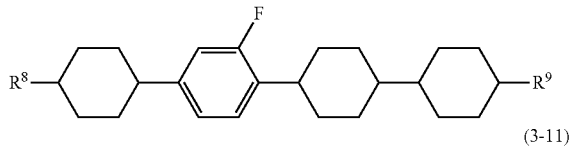

(3-11)
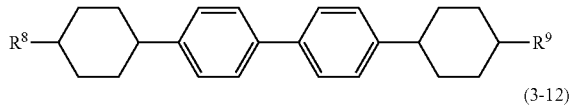

(3-12)
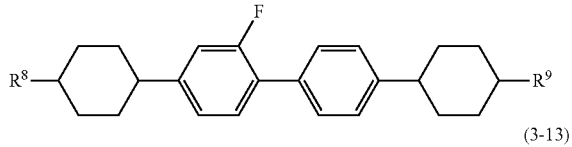

(3-13)
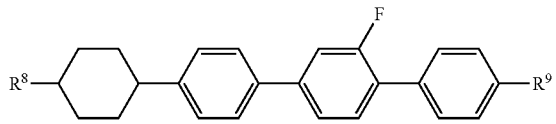

wherein, in formula (3-1) to formula (3-13), $R^8$ and $R^9$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

Item 9. The liquid crystal composition according to item 7 or 8, wherein a ratio of the second component is in the range of 10% by weight to 90% by weight based on the weight of the liquid crystal composition.

Item 10. The liquid crystal composition according to any one of items 1 to 9, containing at least one polymerizable compound selected from the group consisting of compounds represented by formula (4):

(4)
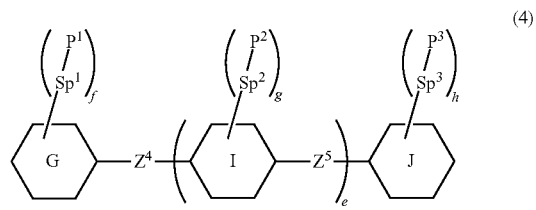

wherein, in formula (4), ring G and ring J are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one of hydrogen may be replaced by halogen, alkyl having 1 to 12 carbons, alkoxy having 1 to 12 carbons, or alkyl having 1 to 12 carbons in which at least one of hydrogen is replaced by halogen; ring I is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one of hydrogen may be replaced by halogen, alkyl having 1 to 12 carbons, alkoxy having 1 to 12 carbons, or alkyl having 1 to 12 carbons in which at least one of hydrogen is replaced by halogen; $Z^4$ and $Z^5$ are independently a single bond or alkylene having 1 to 10 carbons, and in the alkylene, at least one of —$CH_2$— may be replaced by —O—, —CO—, —COO— or —OCO—, at least one of —$CH_2$—$CH_2$— may be replaced by —CH=CH—, —$C(CH_3)$=CH—, —CH=$C(CH_3)$— or —$C(CH_3)$=$C(CH_3)$—, and in the groups, at least one of hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one of —$CH_2$— may be replaced by —O—, —COO—, —OCO— or —OCOO—, at least one of —$CH_2$—$CH_2$— may be replaced by —CH=CH— or —C≡C—, and in the groups, at least one of hydrogen may be replaced by fluorine or chlorine; e is 0, 1 or 2; f, g and h are independently 0, 1, 2, 3 or 4; and a sum of f, g and h is 1 or more.

Item 11. The liquid crystal composition according to item 10, wherein, in formula (4), $P^1$, $P^2$ and $P^3$ are independently a polymerizable group selected from the group consisting of groups represented by formula (P-1) to formula (P-6):

(P-1)
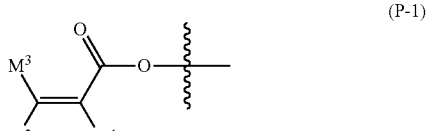

(P-2)
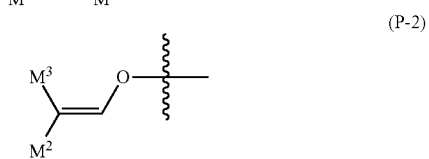

(P-3)
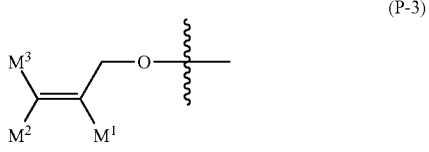

(P-4)

(P-5)

(P-6)
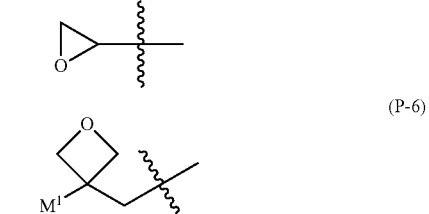

wherein, in formula (P-1) to formula (P-6), $M^1$, $M^2$ and $M^3$ are independently hydrogen, fluorine, alkyl having 1 to 5 carbons, or alkyl having 1 to 5 carbons in which at least one of hydrogen is replaced by halogen; when all of f pieces of $P^1$ and h pieces of $P^3$ are a group represented by formula (P-4), in formula (4), at least one of f pieces of $Sp^1$ and h pieces of $Sp^3$ is alkylene in which at least one of —$CH_2$— is replaced by —O—, —COO—, —OCO— or —OCOO—.

Item 12. The liquid crystal composition according to any one of items 1 to 11, containing at least one polymerizable compound selected from the group consisting of compounds represented by formula (4-1) to formula (4-27):

(4-1) 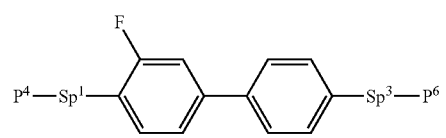
(4-2) 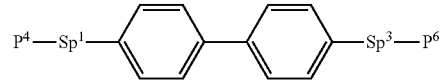
(4-3) 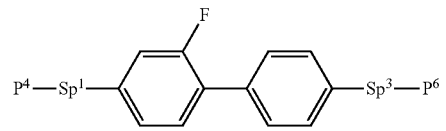
(4-4) 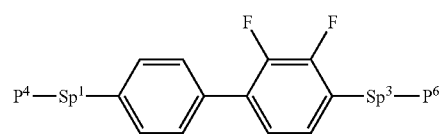
(4-5) 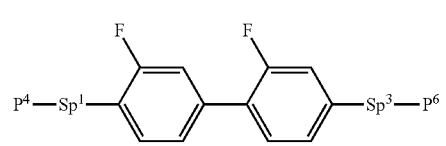
(4-6) 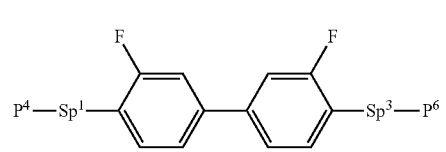
(4-7) 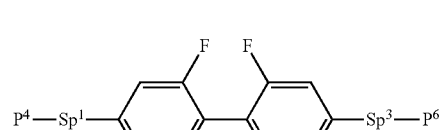
(4-8) 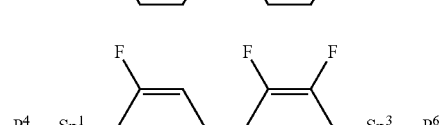
(4-9) 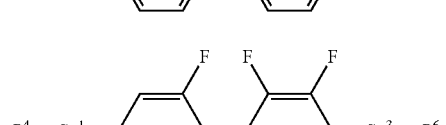
(4-10) 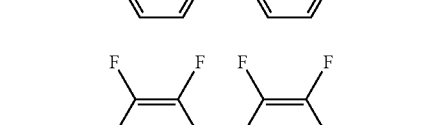
(4-11) 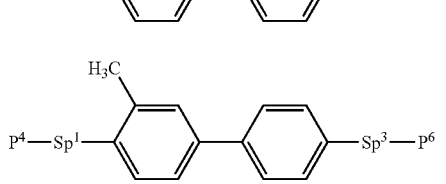
(4-12) 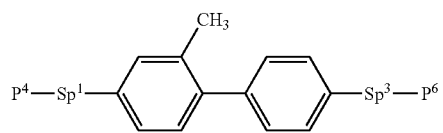
(4-13) 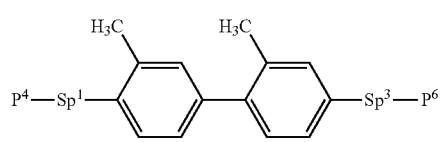
(4-14) 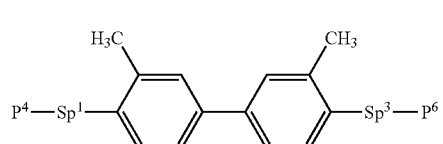
(4-15) 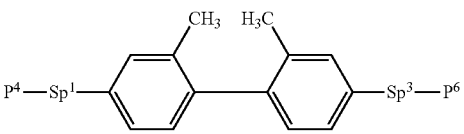
(4-16) 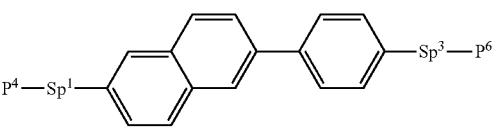
(4-17) 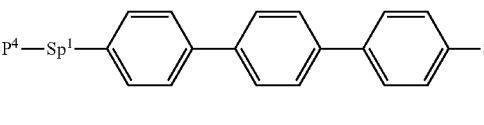
(4-18) 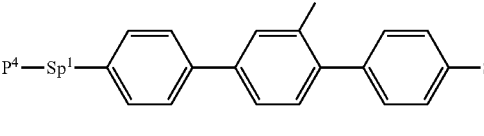
(4-19) 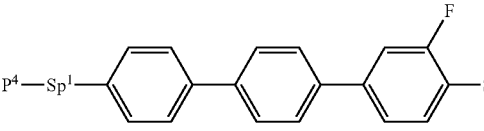
(4-20) 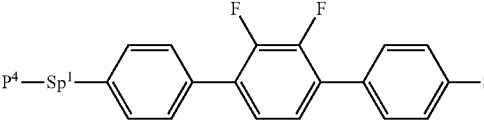
(4-21) 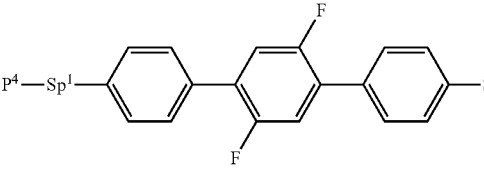

(4-22)
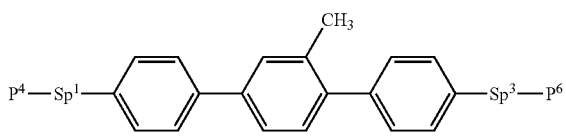

(4-23)
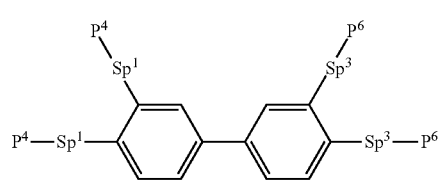

(4-24)
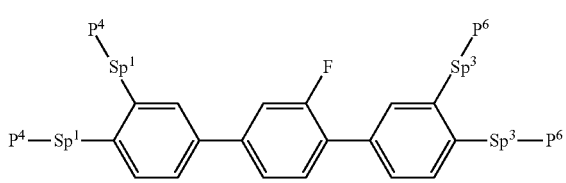

(4-25)
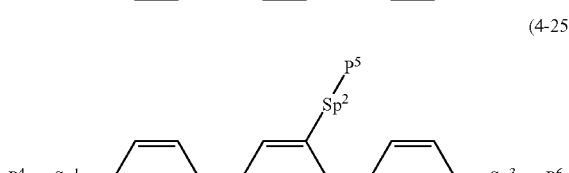

(4-26)
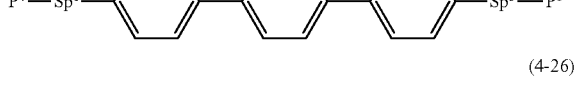

(4-27)
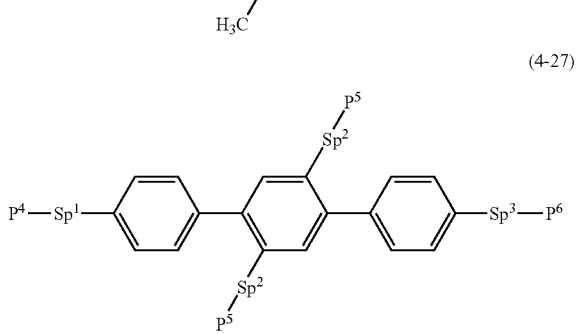

wherein, in formula (4-1) to formula (4-27), $P^4$, $P^5$ and $P^6$ are independently a polymerizable group selected from the group consisting of groups represented by formula (P-1) to formula (P-3);

(P-1)
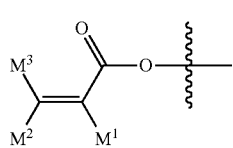

(P-2)
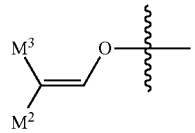

(P-3)
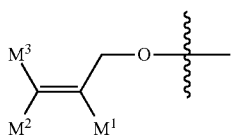

wherein, in formula (P-1) to formula (P-3), $M^1$, $M^2$ and $M^3$ are independently hydrogen, fluorine, alkyl having 1 to 5 carbons, or alkyl having 1 to 5 carbons in which at least one of hydrogen is replaced by halogen; in formula (4-1) to formula (4-27), $Sp^1$, $Sp^2$ and $Sp^3$ are independently alkylene having 1 to 10 carbons, and in the alkylene, at least one of —CH$_2$— may be replaced by —O—, —COO—, —OCO— or —OCOO—, at least one of —CH$_2$—CH$_2$— may be replaced by —CH=CH— or —C≡C—, and in the groups, at least one of hydrogen may be replaced by fluorine or chlorine.

Item 13. The liquid crystal composition according to item 10, wherein a ratio of the compound represented by formula (4) is in the range of 0.03% by weight to 10% by weight based on the weight of the liquid crystal composition.

Item 14. A liquid crystal display device, including the liquid crystal composition according to any one of items 1 to 13.

Item 15. The liquid crystal display device according to item 14, wherein an operating mode in the liquid crystal display device includes an IPS mode, a VA mode, an FFS mode or an FPA mode, and a driving mode in the liquid crystal display device includes an active matrix mode.

Item 16. A liquid crystal display device having a polymer sustained alignment mode, including the liquid crystal composition according to any one of items 10 to 13, wherein the polymerizable compound in the liquid crystal composition is polymerized.

Item 17. Use of the liquid crystal composition according to any one of items 1 to 13 in a liquid crystal display device.

Item 18. Use of the liquid crystal composition according to any one of items 10 to 13 in a liquid crystal display device having a polymer sustained alignment mode.

The invention further also includes the following items: (a) the composition further containing at least one additive such as an optically active compound, an antioxidant, an ultraviolet light absorber, a dye, a defoaming agent, a polymerizable compound, a polymerization initiator and a polymerization inhibitor; (b) an AM device including the composition; (c) an AM device having a polymer sustained alignment (PSA) mode, which includes the composition and further includes a polymerizable compound; (d) an AM device having a polymer sustained alignment (PSA) mode, which includes the composition, wherein the polymerizable compound in the composition is polymerized; (e) a device including the composition, and having a PC, TN, STN, ECB, OCB, IPS, VA, FFS or FPA mode; (f) a transmissive device including the composition; (g) use of the composition as the composition having the nematic phase; and (h) use as an optically active composition by adding the optically active compound to the composition.

The composition of the invention will be described in the following order. First, a constitution of the component compounds in the composition will be described. Second, main characteristics of the component compounds and main effects of the compounds on the composition will be described. Third, a combination of components in the composition, a preferred ratio of the component compounds and the basis thereof will be described. Fourth, a preferred embodiment of the component compounds will be described. Fifth, preferred component compounds are shown. Sixth, an additive that may be added to the composition will be described. Seventh, methods for synthesizing the component compounds will be described. Last, an application of the composition will be described.

First, the constitution of the component compounds in the composition will be described. The composition of the invention is classified into composition A and composition B. Composition A may further contain any other liquid crystal compound, an additive or the like in addition to the liquid crystal compound selected from compound (2) and compound (3). "Any other liquid crystal compound" means a liquid crystal compound different from compound (2) and compound (3). Such a compound is mixed with the composition for the purpose of further adjusting the characteristics. The additive includes the optically active compound, the antioxidant, the ultraviolet light absorber, the dye, the antifoaming agent, the polymerizable compound, the polymerization initiator and the polymerization inhibitor.

Composition B consists essentially of the liquid crystal compound selected from compound (2) and compound (3). A term "essentially" means that the composition may contain the additive, but does not contain any other liquid crystal compound. An example of composition B is a composition containing compound (1), compound (2) and compound (3) as an essential component. Composition B has a smaller number of components than composition A has. Composition B is preferred to composition A in view of cost reduction. Composition A is preferred to composition B in view of possibility of further adjusting the characteristics by mixing any other liquid crystal compound.

Second, the main characteristics of the component compounds and the main effects of the compounds on the characteristics of the composition will be described. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent a classification based on a qualitative comparison among the component compounds, and 0 (zero) means that a value is zero or nearly zero.

TABLE 2

Characteristics of Compounds

| Compounds | Compound (2) | Compound (3) |
|---|---|---|
| Maximum temperature | S to M | S to L |
| Viscosity | L | S to M |
| Optical anisotropy | M to L | S to L |
| Dielectric anisotropy | L[1)] | 0 |
| Specific resistance | L | L |

[1)]A value of dielectric anisotropy is negative, and the symbol shows magnitude of an absolute value.

Upon mixing the component compounds with the composition, the main effects of the component compounds on the characteristics of the composition are as described below. Compound (1) contributes to a high stability to heat or ultraviolet light. Compound (1) produces no difference to the characteristics of the maximum temperature, the optical anisotropy and the dielectric anisotropy. Compound (2) being the first component increases the dielectric anisotropy, and decreases the minimum temperature. Compound (3) being the second component decreases the viscosity or increases the maximum temperature. Compound (4) yields a polymer by polymerization, and the polymer shortens the response time in the device, and improves image persistence.

Third, the combination of components in the composition, the preferred ratio of the component compounds and the basis thereof will be described. The preferred combination of components in the composition includes a combination of compound (1) and the first component, a combination of compound (1) and the second component, a combination of compound (1), the first component and the second component, a combination of compound (1), the first component and compound (4), a combination of compound (1), the second component and compound (4), or a combination of compound (1), the first component, the second component and compound (4). A further preferred combination is a combination of compound (1), the first component and the second component.

The preferred addition ratio of compound (1) is approximately 0.005% by weight or more, based on the weight of the liquid crystal composition, for contributing to the high stability to heat or ultraviolet light, and approximately 1% by eight or less for decreasing the minimum temperature. A further preferred ratio is in the range of approximately 0.01% by weight to approximately 0.5% by weight based thereon. A particularly preferred ratio of addition is in the range of approximately 0.03% by weight to approximately 0.3% by weight, based thereon.

A preferred ratio of the first component is approximately 10% by weight or more for increasing the dielectric anisotropy, and approximately 90% by weight or less for decreasing the minimum temperature, based on the weight of the liquid crystal composition. A further preferred ratio is in the range of approximately 20% by weight to approximately 80% by weight based thereon. A particularly preferred ratio is in the range of approximately 30% by weight to approximately 70% by weight based thereon.

A preferred ratio of the second component is approximately 10% by weight or more for increasing the maximum temperature or decreasing the viscosity, and approximately 90% or less for increasing the dielectric anisotropy, based on the weight of the liquid crystal composition. A further preferred ratio is in the range of approximately 20% by weight to approximately 80% by weight based thereon. A particularly preferred ratio is in the range of approximately 30% by weight to approximately 70% by weight based thereon.

Compound (4) is added to the composition for allowing the composition to adapt to the liquid crystal display device having a polymer sustained alignment mode. A preferred ratio of addition of the additive is approximately 0.03% by weight or more for aligning liquid crystal molecules and approximately 10% by weight or less for preventing poor display on the device, based on the weight of the liquid crystal composition. A further preferred ratio of addition is in the range of approximately 0.1% by weight to approximately 2% by weight based thereon. A particularly preferred ratio of addition is approximately 0.2% by weight to approximately 1.0% by weight based thereon.

Fourth, the preferred embodiment of the component compounds will be described. In formula (1), $R^1$ is hydrogen or alkyl having 1 to 15 carbons. Preferred $R^1$ is hydrogen or methyl. $R^2$, $R^3$, $R^4$ and $R^5$ are independently hydrogen or alkyl having 1 to 4 carbons. Preferred $R^2$, $R^3$, $R^4$ or $R^5$ is hydrogen or methyl.

Ring A is phenyl or cyclohexyl. Preferred ring A is phenyl.

Then, a is 3 or 4. Preferred a is 4.

In formula (2) and formula (3), $R^6$ and $R^7$ are independently alkyl having 1 to 12 carbons, alkoxy having 1 to 12 carbons, alkenyl having 2 to 12 carbons or alkenyloxy having 2 to 12 carbons. Preferred $R^6$ or $R^7$ is alkyl having 1 to 12 carbons for increasing the stability, and alkoxy having 1 to 12 carbons for increasing the dielectric anisotropy. $R^8$ and $R^9$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine. Preferred $R^8$ or $R^9$ is alkenyl having 2 to 12 carbons for decreasing the viscosity, and alkyl having 1 to 12 carbons for increasing the stability.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in the alkenyl such as 1-propenyl, 1-butenyl, 1-pentenyl, 1-hexenyl, 3-pentenyl and 3-hexenyl for decreasing the viscosity, for instance. Cis is preferred in the alkenyl such as 2-butenyl, 2-pentenyl and 2-hexenyl. In the alkenyl, straight-chain alkenyl is preferred to branched-chain alkenyl.

Preferred alkenyloxy is vinyloxy, allyloxy, 3-butenyloxy, 3-pentenyloxy or 4-pentenyloxy. A further preferred alkenyloxy is allyloxy or 3-butenyloxy for decreasing the viscosity.

Preferred examples of alkenyl in which at least one of hydrogen is replaced by fluorine include 2,2-difluorovinyl, 3,3-difluoro-2-propenyl, 4,4-difluoro-3-butenyl, 5,5-difluoro-4-pentenyl or 6,6-difluoro-5-hexenyl. A further preferred example is 2,2-difluorovinyl or 4,4-difluoro-3-butenyl for decreasing the viscosity.

Ring B and ring D are independently 1,4-cyclohexylene, 1,4-cyclohexenylene, 1,4-phenylene, 1,4-phenylene in which at least one of hydrogen is replaced by fluorine or chlorine, or tetrahydropyran-2,5-diyl. Preferred examples of "1,4-phenylene in which at least one of hydrogen is replaced by fluorine or chlorine" include 2-fluoro-1,4-phenylene, 2,3-difluoro-1,4-phenylene or 2-chloro-3-fluoro-1,4-phenylene. Preferred ring B or ring D is 1,4-cyclohexylene for decreasing the viscosity, tetrahydropyran-2,5-diyl for increasing the dielectric anisotropy, and 1,4-phenylene for increasing the optical anisotropy. With regard to a configuration of 1,4-cyclohexylene, trans is preferred to cis for increasing the maximum temperature. Tetrahydropyran-2,5-diyl includes:

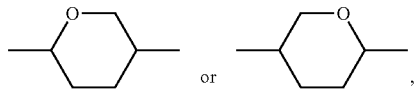

and preferably

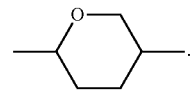

Ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring C is 2,3-difluoro-1,4-phenylene for decreasing the viscosity, 2-chloro-3-fluoro-1,4-phenylene for decreasing the optical anisotropy, and 7,8-difluorochroman-2,6-diyl for increasing the dielectric anisotropy.

Ring E and Ring F are independently 1,4-cyclohexylene, 1,4-phenylene, 2-fluoro-1,4-phenylene or 2,5-difluoro-1,4-phenylene. Preferred ring E or ring F is 1,4-cyclohexylene for decreasing the viscosity or increasing the maximum temperature, and 1,4-phenylene for decreasing the minimum temperature.

$Z^1$ and $Z^2$ are independently a single bond, ethylene, methyleneoxy or carbonyloxy. Preferred $Z^1$ or $Z^2$ is a single bond for decreasing the viscosity, ethylene for decreasing the minimum temperature, and methyleneoxy for increasing the dielectric anisotropy. $Z^3$ is a single bond, ethylene or carbonyloxy. Preferred $Z^3$ is a single bond for decreasing the viscosity.

Then, b is 1, 2, or 3. Preferred b is 1 for decreasing the viscosity, and 2 or 3 for increasing the maximum temperature. Further, c is 0 or 1. Preferred c is 0 for decreasing the viscosity, and 1 for decreasing the minimum temperature. Then, d is 1, 2 or 3. Preferred d is 1 for decreasing the viscosity, and 2 or 3 for increasing the maximum temperature.

In formula (4), $P^1$, $P^2$ and $P^3$ are independently a polymerizable group. Preferred $P^1$, $P^2$ or $P^3$ is a polymerizable group selected from the group consisting of groups represented by formula (P-1) to formula (P-6). Further preferred $P^1$, $P^2$ or $P^3$ is group (P-1) or group (P-2). Particularly preferred group (P-1) is —OCO—CH═$CH_2$ or —OCO—C($CH_3$)═$CH_2$. A wavy line in group (P-1) to group (P-6) represents a part to be bonded.

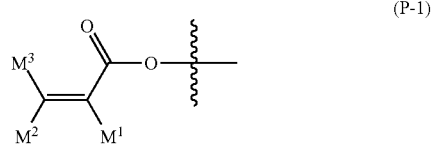 (P-1)

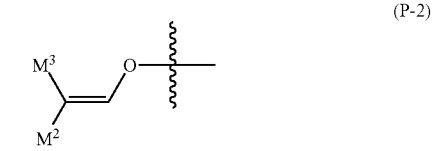 (P-2)

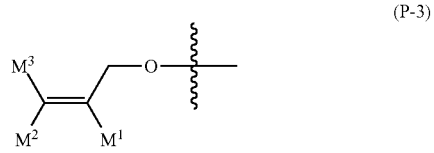 (P-3)

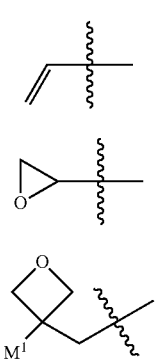

(P-4)

(P-5)

(P-6)

In group (P-1) to group (P-6), $M^1$, $M^2$ and $M^3$ are independently hydrogen, fluorine, alkyl having 1 to 5 carbons, or alkyl having 1 to 5 carbons in which at least one of hydrogen is replaced by halogen. Preferred $M^1$, $M^2$ or $M^3$ is hydrogen or methyl for increasing reactivity. Further preferred $M^1$ is methyl and further preferred $M^2$ or $M^3$ is hydrogen. When at least two of f pieces of $P^1$, exg pieces of $P^2$ and h pieces of $P^3$ are group (P-1), two of arbitrary $M^1$, $M^2$ or $M^3$ of $P^1$, $P^2$ and $P^3$ may be identical or different. A same rule applies to group (P-2) or group (P-3).

When all of f pieces of $P^1$ and h pieces of $P^3$ are group (P-4), in at least one of f pieces of $Sp^1$ and g pieces of $Sp^3$, at least one of —$CH_2$— is alkylene replaced by —O—, —COO—, —OCO— or —OCOO—. More specifically, a case where all of f pieces of $P^1$ and h pieces of $P^3$ are alkenyl such as 1-propenyl is excluded.

In formula (4-1) to formula (4-27), $P^4$, $P^5$ and $P^6$ are independently a group represented by formula (P-1) to formula (P-3). Preferred $P^4$, $P^5$ or $P^6$ is group (P-1) or group (P-2). Further preferred group (P-1) is —OCO—CH=$CH_2$ or —OCO—O($CH_3$)=$CH_2$. A wavy line in group (P-1) to group (P-6) represents a part to be bonded.

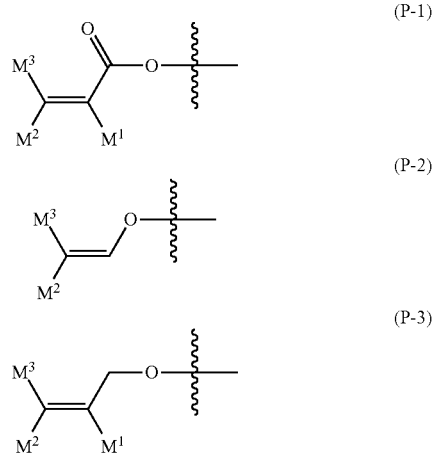

(P-1)

(P-2)

(P-3)

When at least two of one or two of $P^4$, one or two of $P^5$ and one or two of $P^6$ are group (P-1), two of arbitrary $M^1$, $M^2$ or $M^3$ of $P^4$, $P^5$ and $P^6$ may be identical or different. A same rule applies also to a case where at least two thereof is group (P-2) or group (P-3).

In formula (4), $Sp^1$, $Sp^2$ and $Sp^3$ are independently a single bond or alkylene having 1 to 10 carbons, and in the alkylene, at least one of —$CH_2$— may be replaced by —O—, —COO—, —OCO— or —OCOO—, at least one of —$CH_2$—$CH_2$— may be replaced by —CH=CH— or —C≡C—, and in the groups, at least one of hydrogen may be replaced by fluorine or chlorine. Preferred $Sp^1$, $Sp^2$ or $Sp^3$ is a single bond.

Ring G and ring J are independently cyclohexyl, cyclohexenyl, phenyl, 1-naphthyl, 2-naphthyl, tetrahydropyran-2-yl, 1,3-dioxane-2-yl, pyrimidine-2-yl, or pyridine-2-yl, and in the rings, at least one of hydrogen may be replaced by halogen, alkyl having 1 to 12 carbons, alkoxy having 1 to 12 carbons, or alkyl having 1 to 12 carbons in which at least one of hydrogen is replaced by halogen. Preferred ring G and ring J are phenyl. Ring I is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one of hydrogen may be replaced by halogen, alkyl having 1 to 12 carbons, alkoxy having 1 to 12 carbons, or alkyl having 1 to 12 carbons in which at least one of hydrogen is replaced by halogen. Preferred ring I is 1,4-phenylene or 2-fluoro-1,4-phenylene.

$Z^4$ and $Z^5$ are independently a single bond or alkylene having 1 to 10 carbons, and in the alkylene, at least one of —$CH_2$— may be replaced by —O—, —CO—, —COO— or —OCO—, at least one of —$CH_2$—$CH_2$— may be replaced by —CH=CH—, —C($CH_3$)=CH—, —CH=C($CH_3$)— or —C($CH_3$)=C($CH_3$)—, and in the groups, at least one of hydrogen may be replaced by fluorine or chlorine. Preferred $Z^4$ or $Z^5$ is a single bond, —$CH_2CH_2$—, —$CH_2O$—, —$OCH_2$—, —COO— or —OCO—. Further preferred $Z^4$ or $Z^5$ is a single bond.

Then, e is 0, 1, or 2. Preferred e is 0 or 1. Further, f, g and h are independently 0, 1, 2, 3 or 4, and a sum of f, g and h is 1 or more. Preferred f, g or h is 1 or 2.

Fifth, the preferred component compounds are shown. Preferred compound (1) includes compound (1-1) and compound (1-2) as described in item 2. Further preferred compound (1) includes compound (1-1).

Preferred compound (2) includes compound (2-1) to compound (2-21) as described in item 5. In the compounds, at least one of the first components preferably includes compound (2-1), compound (2-4), compound (2-5), compound (2-7), compound (2-10) or compound (2-15). At least two of the first components preferably includes a combination of compound (2-1) and compound (2-7), a combination of compound (2-1) and compound (2-15), a combination of compound (2-4) and compound (2-7), a combination of compound (2-4) and compound (2-15), or a combination of compound (2-5) and compound (2-10).

Preferred compound (3) includes compound (3-1) to compound (3-13) as described in item 8. In the compounds, at least one of the second components includes compound (3-1), compound (3-3), compound (3-5), compound (3-6), compound (3-7) or compound (3-8). At least two of the second components preferably includes a combination of compound (3-1) and compound (3-3), a combination of compound (3-1) and compound (3-5), or a combination of compound (3-1) and compound (3-6).

Preferred compound (4) includes compound (4-1) to compound (4-27) as described in item 12. In the compounds, at least one of the additive components preferably includes compound (4-1), compound (4-2), compound (4-24), compound (4-25), compound (4-26) or compound (4-27). At least two of the additive components preferably includes a combination of compound (4-1) and compound (4-2), a combination of compound (4-1) and compound (4-18), a combination of compound (4-2) and compound (4-24), a combination of compound (4-2) and compound (4-25), a combination of compound (4-2) and compound (4-26), a combination of compound (4-25) and compound (4-26), or a combination of compound (4-18) and compound (4-24). In group (P-1) to group (P-3), preferred $M^1$, $M^2$ or $M^3$ is hydrogen or methyl. Preferred $Sp^1$, $Sp^2$ or $Sp^3$ is a single bond, —CH$_2$CH$_2$—, —CH$_2$O—, —OCH$_2$—, —COO—, —OCO—, —CO—CH=CH— or —CH=CH—CO—.

Sixth, the additive that may be added to the composition will be described. Such an additive includes the optically active compound, the antioxidant, the ultraviolet light absorber, the dye, the antifoaming agent, the polymerizable compound, the polymerization initiator and the polymerization inhibitor. The optically active compound is added to the composition for the purpose of inducing a helical structure in liquid crystals to give a twist angle. Examples of such a compound include compound (5-1) to compound (5-5). A preferred ratio of the optically active compound is approximately 5% by weight or less. A further preferred ratio is in the range of approximately 0.01% by weight to approximately 2% by weight.

(5-1)

(5-2)

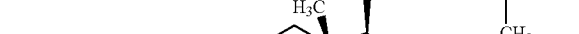
(5-3)

(5-4)

(5-5)

The antioxidant is added to the composition for the purpose of preventing a decrease in specific resistance caused by heating in air, or maintaining a large voltage holding ratio at room temperature and also at a temperature close to the maximum temperature of the nematic phase after the device has been used for a long period of time. Preferred examples of the antioxidant include compound (6) where n is an integer from 1 to 9.

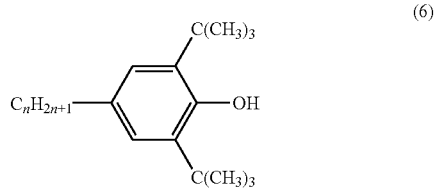
(6)

In compound (6), preferred n is 1, 3, 5, 7 or 9. Further preferred n is 7. Compound (6) where n is 7 is effective in maintaining a large voltage holding ratio at room temperature and also at a temperature close to the maximum temperature after the device has been used for a long period of time because such compound (6) has a small volatility. A preferred ratio of the antioxidant is approximately 50 ppm or more for achieving the effect thereof, and approximately 600 ppm or less for avoiding a decrease in the maximum temperature or avoiding an increase in the minimum temperature. A further preferred ratio is in the range of approximately 100 ppm to approximately 300 ppm.

Preferred examples of the ultraviolet light absorber include a benzophenone derivative, a benzoate derivative and a triazole derivative. A light stabilizer such as an amine having steric hindrance is also preferred. A preferred ratio of the ultraviolet light absorber or the stabilizer is approximately 50 ppm or more for achieving the effect thereof, and approximately 10,000 ppm or less for avoiding a decrease in the maximum temperature or avoiding an increase in the minimum temperature. A further preferred ratio is in the range of approximately 100 ppm to approximately 10,000 ppm.

A dichroic dye such as an azo dye or an anthraquinone dye is added to the composition to be adapted for a device having a guest host (GH) mode. A preferred ratio of the dye is in the range of approximately 0.01% by weight to approximately 10% by weight. The antifoaming agent such as dimethyl silicone oil or methyl phenyl silicone oil is added to the composition for preventing foam formation. A preferred ratio of the antifoaming agent is approximately 1 ppm or more for achieving the effect thereof, and approximately 1,000 ppm or less for avoiding a poor display. A further preferred ratio is in the range of approximately 1 ppm to approximately 500 ppm.

The polymerizable compound is used to be adapted for a device having the polymer sustained alignment (PSA) mode. Compound (4) is suitable for the above purpose. A polymerizable compound different from compound (4) may be added to the composition together with compound (4). Preferred examples of such a polymerizable compound include a compound such as an acrylate, a methacrylate, a vinyl compound, a vinyloxy compound, a propenyl ether, an epoxy compound (oxirane, oxetane) and vinyl ketone. Further preferred examples include a derivative of acrylate or methacrylate. A preferred ratio of compound (4) is approximately 10% by weight or more based on the total weight of the polymerizable compound. A further preferred ratio is approximately 50% by weight or more based thereon. A particularly preferred ratio is approximately 80% by weight or more based thereon. A most preferred ratio is approximately 100% by weight based thereon.

The polymerizable compound such as compound (4) polymerizes by irradiation with ultraviolet light. The compound may be polymerized also in the presence of a suitable initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photopolymerization initiator, is suitable for radical polymerization. A preferred ratio of the photopolymerization initiator is in the range of approximately 0.1% by weight to approximately 5% by weight based on the total weight of the polymerizable compound. A further preferred ratio is in the range of approximately 1% by weight to approximately 3% by weight based thereon.

When the polymerizable compound such as compound (4) is stored, the polymerization inhibitor may be added for preventing polymerization. The polymerizable compound is ordinarily added to the composition without removing the polymerization inhibitor. Examples of the polymerization inhibitor include hydroquinone and a hydroquinone derivative such as methylhydroquinone, 4-tert-butylcatechol, 4-methoxy phenol and phenothiazine.

Seventh, the methods for synthesizing the component compounds will be described. The compounds can be prepared according to known methods. Examples of synthetic methods will be presented. Compound (1-1) is prepared by the method described in JP S47-027981 A. Compound (2-1) is prepared by the method described in JP 2000-053602 A. Compound (3-1) is prepared by the method described in JP S59-176221 A. Compound (3-13) is prepared by the method described in JP H2-237949 A. Compound (4-18) is prepared by the method described in JP H7-101900 A. A compound represented by formula (6) where n is 1 is available from Sigma-Aldrich Corporation. Compound (6) where n is 7 and so forth are prepared according to the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be described. The composition mainly has a minimum temperature of approximately −10° C. or lower, a maximum temperature of approximately 70° C. or higher, and an optical anisotropy in the range of approximately 0.07 to approximately 0.20. The device including the composition has a large voltage holding ratio. The composition is suitable for use in the AM device. The composition is particularly suitable for use in a transmissive AM device. The composition having an optical anisotropy in the range of approximately 0.08 to approximately 0.25, and also the composition having an optical anisotropy in the range of approximately 0.10 to approximately 0.30 may be prepared by controlling the ratio of the component compounds or by mixing with any other liquid crystal compound. The composition can be used as the composition having the nematic phase and as the optically active composition by adding the optically active compound.

The composition can be used for the AM device. The composition can also be used for a PM device. The composition can be used for an AM device and a PM device having a mode such as PC, TN, STN, ECB, OCB, IPS, FFS, VA or FPA. Use for an AM device having the TN, OCB, IPS or FFS mode is particularly preferred. In an AM device having the IPS mode or FFS mode, alignment of the liquid crystal molecules when no voltage is applied may be parallel or perpendicular to a glass substrate. The devices may be of a reflective type, a transmissive type or a transflective type. Use for the transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, and for a polymer dispersed (PD) device in which a three-dimensional network polymer is formed in the composition.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be described in greater detail by way of Examples. The invention is not restricted by the Examples. The invention includes a mixture of a composition in Example 1 and a composition in Example 2. The invention also includes a mixture obtained by mixing at least two of compositions in Composition Examples. A prepared compound was identified by a method such as NMR analysis. Characteristics of a compound and the composition were measured by methods as described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, measurement was carried out under conditions of 24 times of accumulation using $CFCl_3$ as an internal standard. In the explanation of nuclear magnetic resonance spectra, s, d, t, q, quin, sex, m stand for a 4 singlet, a doublet, a triplet, a quartet, a quintet, a sextet and a multiplet, respectively, and br being broad.

Gas chromatographic analysis: GC-14B Gas Chromatograph made by Shimadzu Corporation was used for measurement. A carrier gas was helium (2 mL/min). A sample injector and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample injector. A recorder was C-R5A Chromatopac made by Shimadzu Corporation or an equivalent thereof. The resulting chromatogram showed a retention time of a peak and a peak area corresponding to each of the component compounds.

As a solvent for diluting the sample, chloroform, hexane and so forth may also be used. The following capillary columns may also be used for separating the component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

A ratio of liquid crystal compounds contained in the composition may be calculated by the method as described below. A mixture of liquid crystal compounds is detected with a gas chromatograph (FID). A ratio of peak areas in a gas chromatogram corresponds to a ratio (weight ratio) of the liquid crystal compounds. When the capillary columns described above were used, a correction coefficient of each of the liquid crystal compounds may be regarded as 1 (one). Accordingly, a ratio (% by weight) of the liquid crystal compounds can be calculated from the ratio of the peak areas.

Sample for measurement: When characteristics of a composition are measured, the composition was used as a sample as was. When characteristics of a compound were measured, a sample for measurement was prepared by mixing the compound (15% by weight) with a base liquid crystal (85% by weight). Values of characteristics of the compound were calculated using values obtained by measurement, according to an extrapolation method: (extrapolated value)={(measured value of a sample)−0.85×(measured value of base liquid crystal)}/0.15. When a smectic phase (or crystals) precipitated at the ratio thereof at 25° C., a ratio of the compound to the base liquid crystal was changed step by step in the order of (10% by weight:90% by weight), (5% by weight:95% by weight) and (1% by weight:99% by weight). Values of maximum temperature, optical anisotropy, viscosity and dielectric anisotropy with regard to the compound were determined according to the extrapolation method.

The base liquid crystal as described below was used. Ratios of the component compounds are shown in terms of percent by weight.

[Structure: $C_3H_7$—⬡—COO—⬢—$OC_2H_5$] 17.2%

[Structure: $C_3H_7$—⬡—COO—⬢—$OC_4H_9$] 27.6%

[Structure: $C_4H_9$—⬡—COO—⬢—$OC_2H_5$] 20.7%

[Structure: $C_5H_{11}$—⬡—COO—⬢—$OCH_3$] 20.7%

-continued

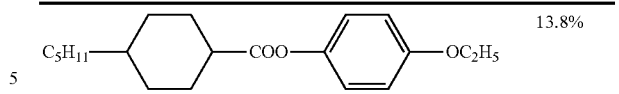

[Structure: $C_5H_{11}$—⬡—COO—⬢—$OC_2H_5$] 13.8%

Measurement method: Measurement of characteristics was carried out by methods described below. Most of the measurement methods were applied as described in the Standard of the Japan Electronics and Information Technology Industries Association (hereinafter abbreviated as JEITA) (JEITA EIAJ ED-2521B) discussed and established by JEITA, or modified thereon. No thin film transistor (TFT) was attached to a TN device used for measurement.

(1) Maximum temperature of a nematic phase (NI; ° C.): A sample was placed on a hot plate in a melting point apparatus equipped with a polarizing microscope and was heated at a rate of 1° C. per minute. Temperature when part of the sample began to change from a nematic phase to an isotropic liquid was measured. A higher limit of a temperature range of the nematic phase may be abbreviated as "maximum temperature".

(2) Minimum temperature of a nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c$<−20° C. A lower limit of the temperature range of the nematic phase may be abbreviated as "minimum temperature".

(3) Viscosity (bulk viscosity; $\gamma_1$; measured at 20° C.; mPa·s): A cone-plate type (E-type) rotational viscometer made by Tokyo Keiki Co., Ltd. was used for measurement.

(4) Viscosity (rotational viscosity; γ1; measured at 25° C.; mPa·s): Measurement was carried out according to the method described in M. Imai et al., Molecular Crystals and Liquid Crystals, Vol. 259, p. 37 (1995). A sample was put in a VA device in which a distance (cell gap) between two glass substrates was 20 micrometers. Voltage was applied stepwise to the device in the range of 39 V to 50 V at an increment of 1 V. After a period of 0.2 second with no voltage application, voltage was applied repeatedly under the conditions of only one rectangular wave (rectangular pulse; 0.2 second) and no voltage application (2 seconds). A peak current and a peak time of a transient current generated by the applied voltage were measured. A value of rotational viscosity was obtained from the measured values and a calculation equation (8) on page 40 of the paper presented by M. Imai et al. Dielectric anisotropy required for the calculation was measured according to measurement (6) described below.

(5) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n∥−n⊥.

(6) Dielectric anisotropy (Δ∈; measured at 25° C.): A value of dielectric anisotropy was calculated from an equation: $\Delta\epsilon = \epsilon_{\|} - \epsilon_{\perp}$. A dielectric constant ($\epsilon_{\|}$ and $\epsilon_{\perp}$) was measured as described below.

(1) Measurement of dielectric constant ($\epsilon_{\|}$): An ethanol (20 mL) solution of octadecyl triethoxysilane (0.16 mL) was applied to a well-cleaned glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant ($\epsilon_{\|}$) in the major axis direction of liquid crystal molecules was measured.

(2) Measurement of dielectric constant ($\epsilon_{\perp}$): A polyimide solution was applied to a well-cleaned glass substrate. After calcining the glass substrate, rubbing treatment was applied to the alignment film obtained. A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant ($\epsilon_{\perp}$) in the minor axis direction of the liquid crystal molecules was measured.

(7) Threshold voltage (Vth; measured at 25° C.; V): An LCD-5100 luminance meter made by Otsuka Electronics Co., Ltd. was used for measurement. A light source was a halogen lamp. A sample was put in a VA device of a normally black mode, in which a distance (cell gap) between two glass substrates was 4 micrometers and a rubbing direction was anti-parallel, and the device was sealed with an ultraviolet-curable adhesive. A voltage (60 Hz, rectangular waves) to be applied to the device was increased stepwise from 0 V to 20 V at an increment of 0.02 V. On the occasion, the device was irradiated with light from a direction perpendicular to the device, and the amount of light transmitted through the device was measured. A voltage-transmittance curve was prepared, in which the maximum amount of light corresponds to 100% transmittance and the minimum amount of light corresponds to 0% transmittance. A threshold voltage was expressed in terms of a voltage at 10% transmittance.

(8) Voltage holding ratio (VHR-a; measured at 25° C.; %): A PVA device used for measurement had a polyimide alignment film, and a distance (cell gap) between two glass substrates was 3.5 micrometers. A sample was put in the device, and then the device was sealed with an ultraviolet-curable adhesive. A pulse voltage (60 microseconds at 1 V) was applied to the PVA device and the device was charged. A decaying voltage was measured for 166.7 milliseconds with a high-speed voltmeter, and area A between a voltage curve and a horizontal axis in a unit cycle was determined. Area B was an area without decay. A voltage holding ratio was expressed in terms of percentage of area A to area B.

(9) Voltage holding ratio (VHR-b; measured at 60° C.; %): A voltage holding ratio was measured in a manner similar to the procedures as described above except that measurement was carried out at 60° C. in place of 25° C. A value obtained was expressed in terms of VHR-b.

(10) Voltage holding ratio (VHR-c; measured at 60° C.; %): Stability to ultraviolet light was evaluated by measuring a voltage holding ratio after a device was irradiated with ultraviolet light. A PVA device used for measurement had a polyimide alignment film, and a cell gap was 3.5 micrometers. A sample was injected into the device, and then the device was irradiated with light for 167 minutes. A light source was a black light (peak wavelength: 369 nm), and a distance between the device and the light source was 5 mm. In VHR-c measurement, a decaying voltage was measured for 166.7 milliseconds. A composition having a large VHR-c has a large stability to ultraviolet light.

(11) Voltage holding ratio (VHR-d; measured at 25° C.; %): A PVA device into which a sample was injected was heated in a constant-temperature bath at 150° C. for 2 hours, and then stability to heat was evaluated by measuring a voltage holding ratio. In VHR-d measurement, a decaying voltage was measured for 166.7 milliseconds. A composition having a large VHR-4 has a large stability to heat.

(12) Response time ($\tau$; measured at 25° C.; ms): An LCD-5100 luminance meter made by Otsuka Electronics Co., Ltd. was used for measurement. A light source was a halogen lamp. A low-pass filter was set at 5 kHz. A sample was put in a VA device of a normally black mode, in which a distance (cell gap) between two glass substrates was 4 micrometers and a rubbing direction was anti-parallel, and the device was sealed with an ultraviolet-curable adhesive. Rectangular waves (60 Hz, 10 V, 0.5 second) were applied to the device. On the occasion, the device was irradiated with light from a direction perpendicular to the device, and the amount of light transmitted through the device was measured. The maximum amount of light was regarded as correspondence to 100% transmittance, and the minimum amount of light as correspondence to 0% transmittance. A response time was expressed in terms of time required for a change from 90% transmittance to 10% transmittance (fall time; millisecond).

(13) Specific resistance ($\rho$; measured at 25° C.; 0 cm): Into a vessel equipped with electrodes, 1.0 milliliter of a sample was injected. A DC voltage (10 V) was applied to the vessel, and a DC current after 10 seconds was measured. A specific resistance was calculated from the following equation: (specific resistance)={(voltage)×(electric capacity of a vessel)}/{(direct current)×(dielectric constant of vacuum)}.

The compounds in Examples and Comparative Example were expressed using symbols according to definitions in Table 3 below. In Table 3, a configuration of 1,4-cyclohexylene is trans. A parenthesized number next to a symbolized compound corresponds to the number of the compound. A symbol (–) means any other liquid crystal compound. A ratio (percentage) of a liquid crystal compound is expressed in terms of weight percentage (% by weight) based on the weight of the liquid crystal composition. Values of characteristics of the composition were summarized in the last part.

TABLE 3

Method for Description of Compounds using Symbols
R—($A_1$)—$Z_1$—...—$Z_n$—($A_n$)—R'

| 1) Left-terminal Group R— | Symbol |
|---|---|
| F—$C_nH_{2n}$— | Fn- |
| $C_nH_{2n+1}$— | n- |
| $C_nH_{2n+1}$O— | nO— |
| $C_mH_{2m+1}$O$C_nH_{2n}$— | mOn- |
| $CH_2$=CH— | V— |
| $C_nH_{2n+1}$—CH=CH— | nV— |
| $CH_2$=CH—$C_nH_{2n}$— | Vn- |
| $C_mH_{2m+1}$—CH=CH—$C_nC_{2n}$— | mVn- |
| $CF_2$=CH— | VFF— |
| $CF_2$=CH—$C_nH_{2n}$— | VFFn- |
| $CH_2$=CH—COO— | AC— |
| $CH_2$=C($CH_3$)—COO— | MAC— |

| 2) Right-terminal Group —R' | Symbol |
|---|---|
| —$C_nH_{2n+1}$ | -n |
| —O$C_nH_{2n+1}$ | —On |

TABLE 3-continued

Method for Description of Compounds using Symbols
R—(A₁)—Z₁—...—Zₙ—(Aₙ)—R'

| | |
|---|---|
| —CH=CH₂ | —V |
| —CH=CH—CₙH₂ₙ₊₁ | —Vn |
| —CₙH₂ₙ—CH=CH₂ | -nV |
| —CₘH₂ₘ—CH=CH—CₙH₂ₙ₊₁ | -mVn |
| —CH=CF₂ | —VFF |
| —OCO—CH=CH₂ | —AC |
| —OCO—C(CH₃)=CH₂ | —MAC |

| 3) Bonding Group —Zₙ— | Symbol |
|---|---|
| —CₙH₂ₙ— | n |
| —COO— | E |
| —CH=CH— | V |
| —CH=CHO— | VO |
| —OCH=CH— | OV |
| —CH₂O— | 1O |
| —OCH₂— | O1 |

| 4) Ring Structure —Aₙ— | Symbol |
|---|---|
|  | H |
|  | B |
| 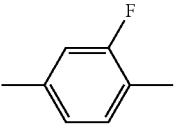 | B(F) |
| 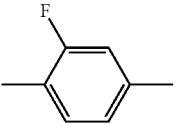 | B(2F) |
| 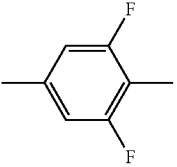 | B(F,F) |
| 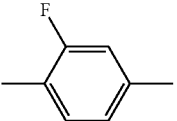 | B(2F,5F) |
| 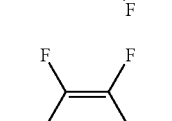 | B(2F,3F) |
| 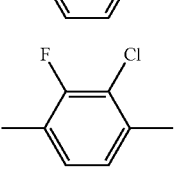 | B(2F,3CL) |
| 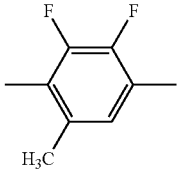 | B(2F,3F,6Me) |
| 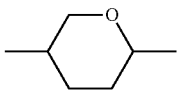 | dh |
| 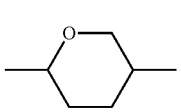 | Dh |
| 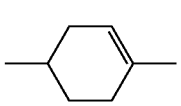 | ch |
| 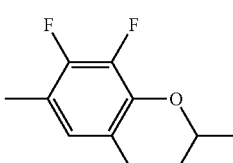 | Cro(7F,8F) |

5) Examples of Description

Example 1  2-BB(F)B-3

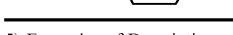

Example 2  3-HHB(2F,3F)-O2

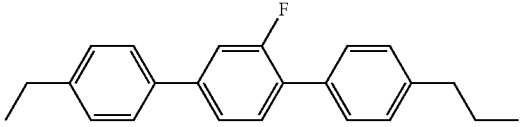 [SMILES: CCCc1ccc(-c2ccc(-c3ccc(CC)cc3)cc2F)cc1]

Example 3  V-HHB-1

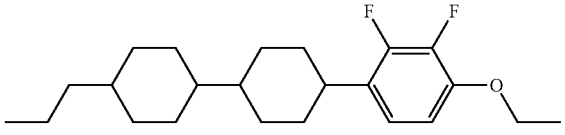 [SMILES: CCCC1CCC(C2CCC(c3ccc(OCC)c(F)c3F)CO2)CC1]

Example 4  3-HDhB(2F,3F)-O2

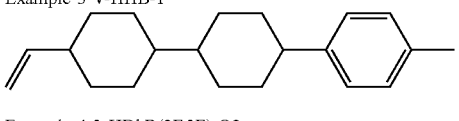

Example 1

| | | |
|---|---|---|
| 2-H1OB(2F,3F)-O2 | (2-4) | 3% |
| 3-H1OB(2F,3F)-O2 | (2-4) | 10% |
| 1V2-BB(2F,3F)-O2 | (2-5) | 10% |
| V-HHB(2F,3F)-O1 | (2-7) | 12% |
| V-HHB(2F,3F)-O2 | (2-7) | 12% |

-continued

| | | |
|---|---|---|
| 3-HH1OB(2F,3F)-O2 | (2-10) | 6% |
| 2-BB(2F,3F)B-3 | (2-11) | 6% |
| 3-HH-V | (3-1) | 25% |
| 3-HH-V1 | (3-1) | 6% |
| 4-HH-V1 | (3-1) | 3% |
| V-HHB-1 | (3-5) | 3% |
| V2-HHB-1 | (3-5) | 4% |

The composition having a negative dielectric anisotropy was prepared, and characteristics thereof were measured. NI=80.1° C.; Tc<−20° C.; Δn=0.103; Δ∈=−3.9; Vth=2.09 V; η=20.7 mPa·s.

To the composition, compound (1-1) was added at a ratio of 0.1% by weight, and VHR-c of the resulting composition was measured. VHR-c=65.6%.

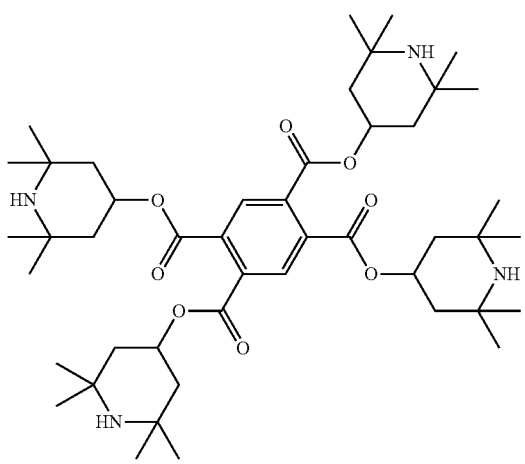

(1-1)

Comparative Example 1

VHR-c of the composition before adding compound (1-1) in Example 1 was measured. VHR-c=34.7%.

Example 2

| | | |
|---|---|---|
| 3-H1OB(2F,3F)-O2 | (2-4) | 8% |
| V2-BB(2F,3F)-O1 | (2-5) | 4% |
| V2-BB(2F,3F)-O2 | (2-5) | 9% |
| 1V2-BB(2F,3F)-O4 | (2-5) | 6% |
| V-HHB(2F,3F)-O2 | (2-7) | 10% |
| V-HHB(2F,3F)-O4 | (2-7) | 3% |
| 1V2-HHB(2F,3F)-O2 | (2-7) | 4% |
| 3-HH1OB(2F,3F)-O2 | (2-10) | 12% |
| 3-HH-V | (3-1) | 26% |
| 1-HH-2V1 | (3-1) | 3% |
| 3-HH-2V1 | (3-1) | 3% |
| 5-HB-O2 | (3-2) | 3% |
| 3-HHB-O1 | (3-5) | 5% |
| V-HHB-1 | (3-5) | 4% |

The composition having a negative dielectric anisotropy was prepared, and characteristics thereof were measured. NI=77.0° C.; Tc<−20° C.; Δn=0.099; Δ∈=−3.4; Vth=2.22 V; η=18.6 mPa·s.

To the composition, compound (1-1) was added at a ratio of 0.07% by weight, and VHR-c of the resulting composition was measured. VHR-c=63.4%.

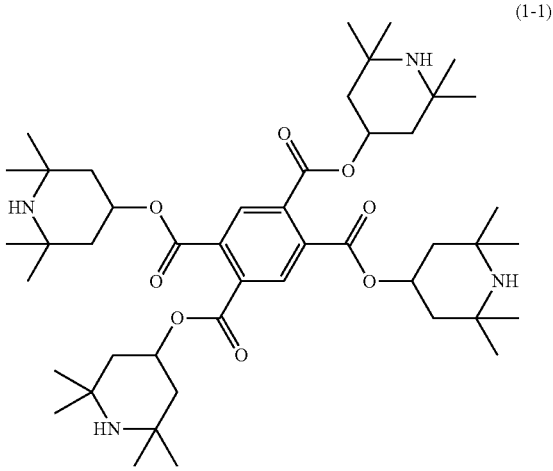

(1-1)

Example 3

| | | |
|---|---|---|
| 3-H2B(2F,3F)-O2 | (2-3) | 15% |
| 5-H2B(2F,3F)-O2 | (2-3) | 12% |
| 3-HHB(2F,3F)-O2 | (2-7) | 8% |
| 5-HHB(2F,3F)-O2 | (2-7) | 6% |
| 2-HHB(2F,3F)-1 | (2-7) | 5% |
| 3-HBB(2F,3F)-O2 | (2-15) | 10% |
| 4-HBB(2F,3F)-O2 | (2-15) | 6% |
| 1V2-HBB(2F,3F)-O2 | (2-15) | 4% |
| 2-HH-3 | (3-1) | 20% |
| 3-HH-4 | (3-1) | 10% |
| V2-BB(F)B-1 | (3-8) | 4% |

The composition having a negative dielectric anisotropy was prepared, and characteristics thereof were measured. NI=80.0° C.; Tc<−20° C.; Δn=0.096; Δ∈=−3.4; Vth=2.19 V; η=19.0 mPa·s.

To the composition, compound (1-2) was added at a ratio of 0.1% by weight, and VHR-c of the resulting composition was measured. VHR-c=87.1%.

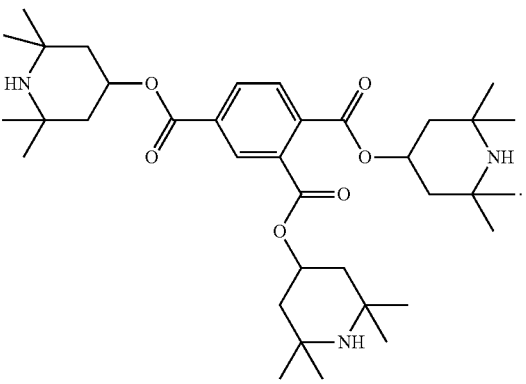

(1-2)

Example 4

| | | |
|---|---|---|
| 3-H1OB(2F,3F)-O2 | (2-4) | 8% |
| 3-BB(2F,3F)-O2 | (2-5) | 8% |
| 2O-BB(2F,3F)-O2 | (2-5) | 5% |
| 2-HH1OB(2F,3F)-O2 | (2-10) | 8% |
| 3-HH1OB(2F,3F)-O2 | (2-10) | 7% |
| 2-BB(2F,3F)B-3 | (2-11) | 8% |
| 3-HDhB(2F,3F)-O2 | (2-13) | 10% |
| 3-HH-V | (3-1) | 24% |
| 3-HH-V1 | (3-1) | 10% |
| V2-HHB-1 | (3-5) | 9% |
| 1O1-HBBH-4 | (—) | 3% |

The composition having a negative dielectric anisotropy was prepared, and characteristics thereof were measured. NI=83.7° C.; Tc<−20° C.; Δn=0.107; Δ∈=−3.7; Vth=2.21 V; η=22.9 mPa·s.

To the composition, compound (1-1) was added at a ratio of 0.05% by weight, and VHR-c of the resulting composition was measured. VHR-c=64.8%.

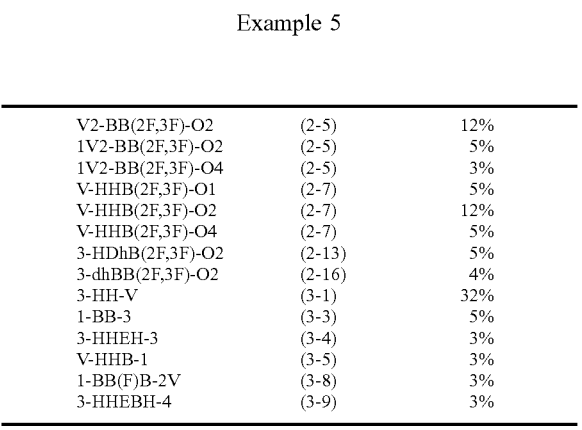

(1-1)

Example 5

| | | |
|---|---|---|
| V2-BB(2F,3F)-O2 | (2-5) | 12% |
| 1V2-BB(2F,3F)-O2 | (2-5) | 5% |
| 1V2-BB(2F,3F)-O4 | (2-5) | 3% |
| V-HHB(2F,3F)-O1 | (2-7) | 5% |
| V-HHB(2F,3F)-O2 | (2-7) | 12% |
| V-HHB(2F,3F)-O4 | (2-7) | 5% |
| 3-HDhB(2F,3F)-O2 | (2-13) | 5% |
| 3-dhBB(2F,3F)-O2 | (2-16) | 4% |
| 3-HH-V | (3-1) | 32% |
| 1-BB-3 | (3-3) | 5% |
| 3-HHEH-3 | (3-4) | 3% |
| V-HHB-1 | (3-5) | 3% |
| 1-BB(F)B-2V | (3-8) | 3% |
| 3-HHEBH-4 | (3-9) | 3% |

The composition having a negative dielectric anisotropy was prepared, and characteristics thereof were measured. NI=78.6° C.; Tc<−20° C.; Δn=0.107; Δ∈=−2.7; Vth=2.36 V; η=18.8 mPa·s.

To the composition, compound (1-1) was added at a ratio of 0.07% by weight, and VHR-c the resulting composition was measured. VHR-c=71.6%.

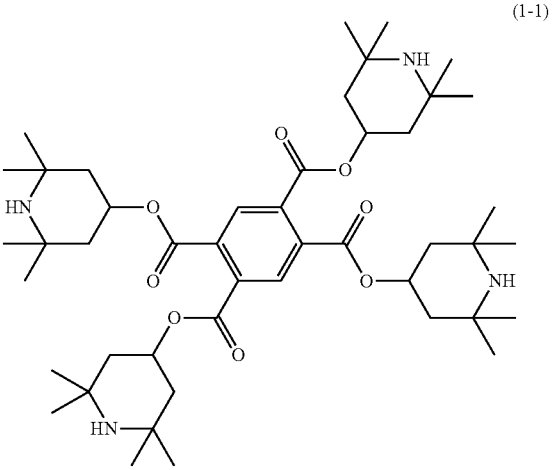

(1-1)

Example 6

| | | |
|---|---|---|
| V2-BB(2F,3F)-O2 | (2-5) | 12% |
| 1V2-BB(2F,3F)-O2 | (2-5) | 6% |
| 1V2-BB(2F,3F)-O4 | (2-5) | 3% |
| V-HHB(2F,3F)-O1 | (2-7) | 6% |
| V-HHB(2F,3F)-O2 | (2-7) | 7% |
| V-HHB(2F,3F)-O4 | (2-7) | 5% |
| 1V2-HHB(2F,3F)-O4 | (2-7) | 5% |
| 3-DhH1OB(2F,3F)-O2 | (2-14) | 5% |
| 3-dhBB(2F,3F)-O2 | (2-16) | 5% |
| 3-HH-V | (3-1) | 26% |
| 3-HH-VFF | (3-1) | 3% |
| V2-HB-1 | (3-2) | 6% |
| V-HHB-1 | (3-5) | 5% |
| 2-BB(F)B-5 | (3-8) | 3% |
| 5-HBB(F)B-3 | (3-13) | 3% |

The composition having a negative dielectric anisotropy was prepared, and characteristics thereof were measured. NI=79.0° C.; Tc<−20° C.; Δn=0.112; Δ∈=−2.9; Vth=2.35 V; η=19.8 mPa·s.

To the composition, compound (1-2) was added at a ratio of 0.11% by weight, and VHR-c of the resulting composition was measured. VHR-c=65.1%.

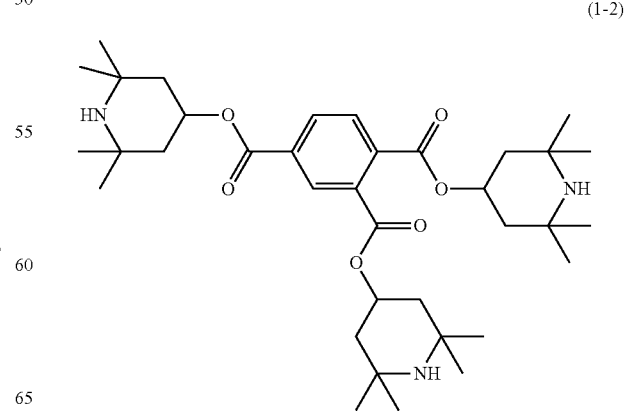

(1-2)

Example 7

| | | |
|---|---|---|
| 3-H1OB(2F,3F)-O2 | (2-4) | 10% |
| 1V2-BB(2F,3F)-O2 | (2-5) | 10% |
| V-HHB(2F,3F)-O1 | (2-7) | 11% |
| V-HHB(2F,3F)-O2 | (2-7) | 12% |
| 3-HH1OB(2F,3F)-O2 | (2-10) | 9% |
| 2-BB(2F,3F)B-3 | (2-11) | 7% |
| 3-HH-V | (3-1) | 26% |
| 3-HH-V1 | (3-1) | 6% |
| 1-HH-2V1 | (3-1) | 3% |
| 3-HHB-3 | (3-5) | 3% |
| V-HHB-1 | (3-5) | 3% |

The composition having a negative dielectric anisotropy was prepared, and characteristics thereof were measured. NI=81.6° C.; Tc<−20° C.; Δn=0.103; Δ∈=−3.7; Vth=2.15 V; η=20.9 mPa·s.

To the composition, compound (1-1) was added at a ratio of 0.06% by weight, and VHR-c of the resulting composition was measured. VHR-c=62.2%.

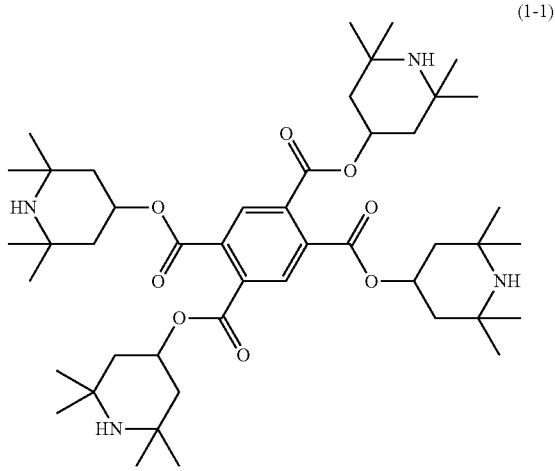

(1-1)

Example 8

| | | |
|---|---|---|
| 3-HB(2F,3F)-O2 | (2-1) | 8% |
| 3-H1OB(2F,3F)-O2 | (2-4) | 8% |
| 3-BB(2F,3F)-O2 | (2-5) | 5% |
| 2-HH1OB(2F,3F)-O2 | (2-10) | 8% |
| 3-HH1OB(2F,3F)-O2 | (2-10) | 7% |
| 3-HDhB(2F,3F)-O2 | (2-13) | 10% |
| 3-HH-V | (3-1) | 25% |
| 3-HH-V1 | (3-1) | 10% |
| V2-HHB-1 | (3-5) | 11% |
| 2-BB(F)B-3 | (3-8) | 8% |

The composition having a negative dielectric anisotropy was prepared, and characteristics thereof were measured. NI=79.4° C.; Tc<−20° C.; Δn=0.100; Δ∈=−3.5; Vth=2.20 V; η=19.5 mPa·s.

To the composition, compound (1-1) was added at a ratio of 0.05% by weight, and VHR-c of the resulting composition was measured. VHR-c=68.3%.

Example 9

| | | |
|---|---|---|
| V2-HB(2F,3F)-O2 | (2-1) | 5% |
| 3-H2B(2F,3F)-O2 | (2-3) | 9% |
| 3-HHB(2F,3F)-O2 | (2-7) | 12% |
| 2-HH1OB(2F,3F)-O2 | (2-10) | 7% |
| 3-HH1OB(2F,3F)-O2 | (2-10) | 12% |
| 3-HDhB(2F,3F)-O2 | (2-13) | 3% |
| 2-HH-3 | (3-1) | 27% |
| 1-BB-3 | (3-3) | 13% |
| 3-HHB-1 | (3-5) | 3% |
| 3-B(F)BB-2 | (3-7) | 3% |
| 3-HB(F)HH-5 | (3-10) | 3% |
| 3-HB(F)BH-3 | (3-12) | 3% |

The composition having a negative dielectric anisotropy was prepared, and characteristics thereof were measured. NI=78.9° C.; Tc<−20° C.; Δn=0.098; Δ∈=−2.9; Vth=2.34 V; η=18.2 mPa·s.

To the composition, compound (1-1) was added at a ratio of 0.03% by weight, and VHR-c of the resulting composition was measured. VHR-c=71.3%.

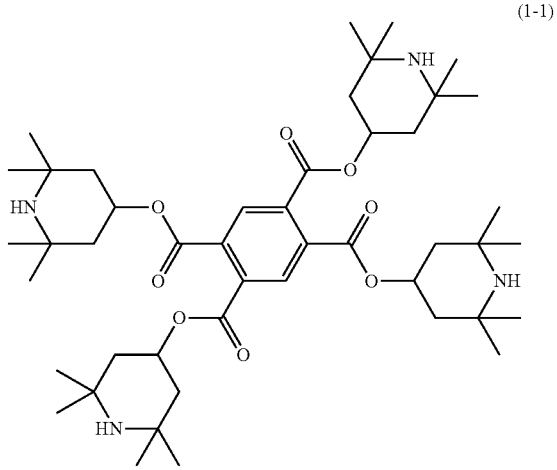

(1-1)

Example 10

| | | |
|---|---|---|
| 5-H2B(2F,3F)-O2 | (2-3) | 9% |
| 5-BB(2F,3F)-O4 | (2-5) | 5% |
| 5-HHB(2F,3F)-O2 | (2-7) | 3% |
| V-HHB(2F,3F)-O2 | (2-7) | 6% |
| 3-HH2B(2F,3F)-O2 | (2-9) | 3% |
| 3-HH1OB(2F,3F)-O2 | (2-10) | 13% |
| 2-BB(2F,3F)B-3 | (2-11) | 3% |
| 2-HHB(2F,3CL)-O2 | (2-18) | 3% |
| 4-HHB(2F,3CL)-O2 | (2-18) | 3% |
| 2-HH-3 | (3-1) | 22% |
| 3-HH-V | (3-1) | 5% |
| V2-BB-1 | (3-3) | 3% |
| 1-BB-3 | (3-3) | 13% |
| 3-HB(F)HH-5 | (3-10) | 3% |
| 5-HBBH-3 | (3-11) | 3% |
| 3-HB(F)BH-3 | (3-12) | 3% |

The composition having a negative dielectric anisotropy was prepared, and characteristics thereof were measured. NI=78.9° C.; Tc<−20° C.; Δn=0.103; Δ∈=−2.6; Vth=2.49 V; η=17.6 mPa·s.

To the composition, compound (1-1) was added at a ratio of 0.05% by weight, and VHR-c of the resulting composition was measured. VHR-c=67.8%.

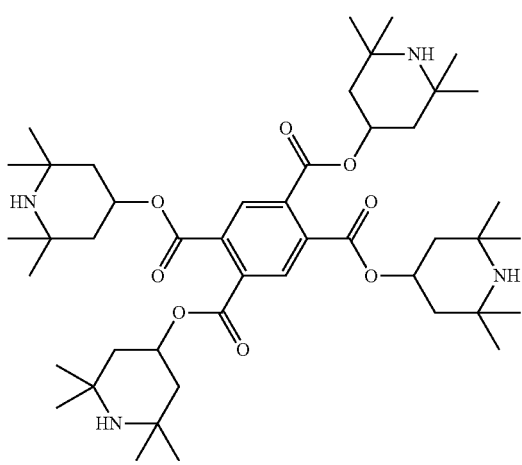

(1-1)

Example 11

| | | |
|---|---|---|
| 3-H2B(2F,3F)-O2 | (2-3) | 20% |
| 5-H2B(2F,3F)-O2 | (2-3) | 12% |
| 3-HHB(2F,3F)-O2 | (2-7) | 8% |
| 5-HHB(2F,3F)-O2 | (2-7) | 6% |
| 3-HDhB(2F,3F)-O2 | (2-13) | 5% |
| 3-HBB(2F,3F)-O2 | (2-15) | 10% |
| 4-HBB(2F,3F)-O2 | (2-15) | 6% |
| 2-HH-3 | (3-1) | 16% |
| 3-HH-4 | (3-1) | 13% |
| 1V-HBB-2 | (3-6) | 4% |

The composition having a negative dielectric anisotropy was prepared, and characteristics thereof were measured. NI=76.2° C.; Tc<−20° C.; Δn=0.089; Δ∈=−3.6; Vth=2.12 V; η=19.8 mPa·s.

To the composition, compound (1-1) was added at a ratio of 0.03% by weight, and VHR-c of the resulting composition was measured. VHR-c=88.2%.

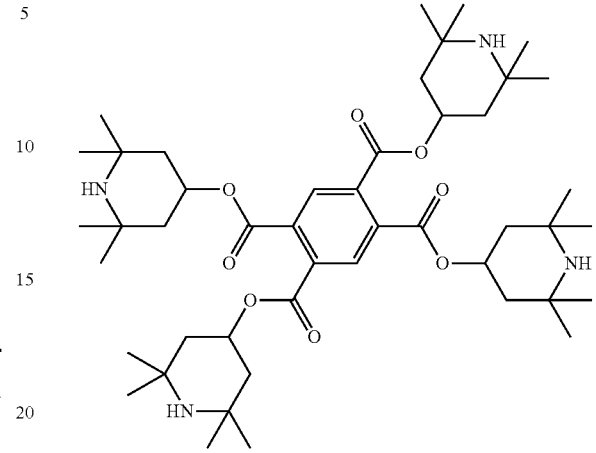

(1-1)

Example 12

| | | |
|---|---|---|
| 3-HB(2F,3F)-O2 | (2-1) | 5% |
| V-HB(2F,3F)-O4 | (2-1) | 4% |
| 5-BB(2F,3F)-O2 | (2-5) | 6% |
| 3-B(2F,3F)B(2F,3F)-O2 | (2-6) | 3% |
| V-HHB(2F,3F)-O2 | (2-7) | 10% |
| 3-HH1OB(2F,3F)-O2 | (2-10) | 10% |
| 2-BB(2F,3F)B-3 | (2-11) | 5% |
| 4-HBB(2F,3F)-O2 | (2-15) | 5% |
| V-HBB(2F,3F)-O2 | (2-15) | 7% |
| 3-HBB(2F,3CL)-O2 | (2-19) | 3% |
| 3-HH-O1 | (3-1) | 3% |
| 3-HH-V | (3-1) | 26% |
| 3-HB-O2 | (3-2) | 3% |
| V-HHB-1 | (3-5) | 7% |
| 3-BB(F)B-5 | (3-8) | 3% |

The composition having a negative dielectric anisotropy was prepared, and characteristics thereof were measured. NI=80.6° C.; Tc<−20° C.; Δn=0.114; Δ∈=−3.2; Vth=2.27 V; η=24.0 mPa·s.

To the composition, compound (1-1) was added at a ratio of 0.1% by weight, and VHR-c of the resulting composition was measured. VHR-c=61.2%.

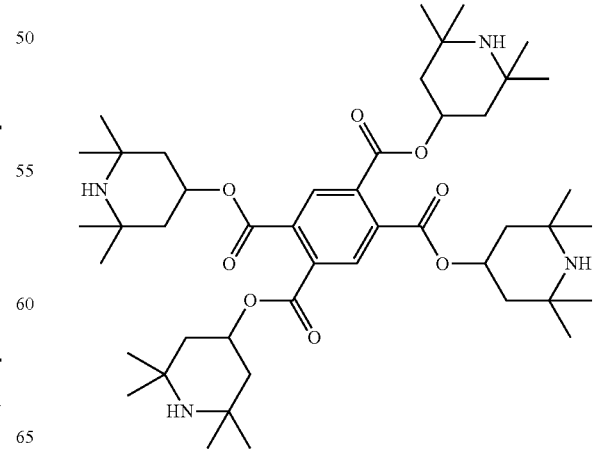

(1-1)

Example 13

| | | |
|---|---|---|
| 3-chB(2F,3F)-O2 | (2-2) | 6% |
| 3-BB(2F,3F)-O4 | (2-5) | 6% |
| V2-BB(2F,3F)-O2 | (2-5) | 6% |
| 3-HHB(2F,3F)-O2 | (2-7) | 5% |
| V-HHB(2F,3F)-O1 | (2-7) | 6% |
| V-HHB(2F,3F)-O2 | (2-7) | 9% |
| 2-HchB(2F,3F)-O2 | (2-8) | 3% |
| 3-DhHB(2F,3F)-O2 | (2-12) | 5% |
| 3-HEB(2F,3F)B(2F,3F)-O2 | (2-17) | 3% |
| 3-H1OCro(7F,8F)-5 | (2-20) | 3% |
| 3-HH1OCro(7F,8F)-5 | (2-21) | 3% |
| 3-HH-V | (3-1) | 23% |
| 4-HH-V | (3-1) | 3% |
| 5-HH-V | (3-1) | 6% |
| 7-HB-1 | (3-2) | 3% |
| V-HHB-1 | (3-5) | 4% |
| V-HBB-2 | (3-6) | 3% |
| 2-BB(F)B-3 | (3-8) | 3% |

The composition having a negative dielectric anisotropy was prepared, and characteristics thereof were measured. NI=70.9° C.; Tc<−20° C.; Δn=0.092; Δ∈=−3.2; Vth=2.16 V; η=22.9 mPa·s.

To the composition, compound (1-2) was added at a ratio of 0.15% by weight, and VHR-c of the resulting composition was measured. VHR-c=72.4%.

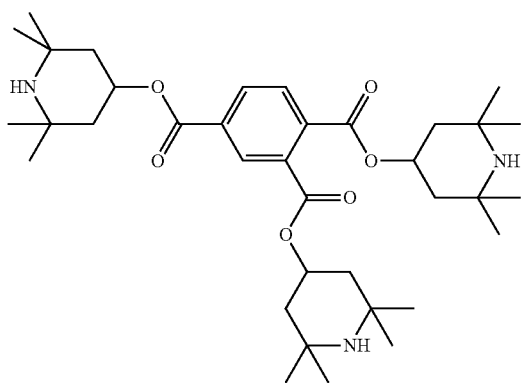

(1-2)

Example 14

| | | |
|---|---|---|
| 5-H2B(2F,3F)-O2 | (2-3) | 9% |
| 5-BB(2F,3F)-O4 | (2-5) | 5% |
| 5-HHB(2F,3F)-O2 | (2-7) | 3% |
| V-HHB(2F,3F)-O2 | (2-7) | 6% |
| 3-HH2B(2F,3F)-O2 | (2-9) | 3% |
| 3-HH1OB(2F,3F)-O2 | (2-10) | 13% |
| 2-BB(2F,3F)B-3 | (2-11) | 3% |
| 2-HHB(2F,3CL)-O2 | (2-18) | 3% |
| 4-HHB(2F,3CL)-O2 | (2-18) | 3% |
| 2-HH-3 | (3-1) | 22% |
| 3-HH-V | (3-1) | 5% |
| V2-BB-1 | (3-3) | 3% |
| 1-BB-5 | (3-3) | 13% |
| 3-HBB-2 | (3-6) | 3% |
| 3-HB(F)HH-5 | (3-10) | 3% |
| 3-HB(F)BH-3 | (3-12) | 3% |

The composition having a negative dielectric anisotropy was prepared, and characteristics thereof were measured. NI=76.1° C.; Tc<−20° C.; Δn=0.103; Δ∈=−2.6; Vth=2.47 V; r=16.8 mPa·s.

To the composition, compound (1-1) was added at a ratio of 0.05% by weight, and VHR-c of the resulting composition was measured. VHR-c=68.1%.

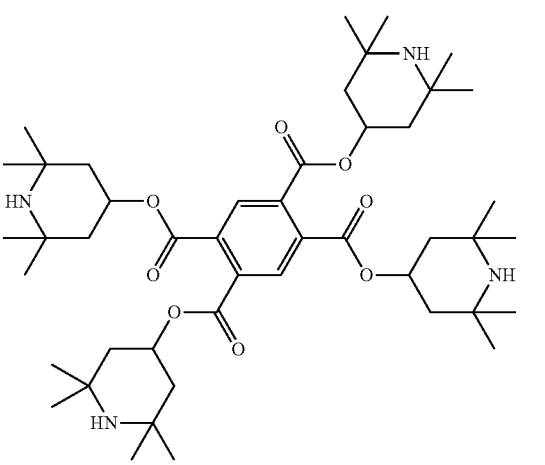

(1-1)

The compositions in Example 1 to Example 14 were found to have a larger voltage holding ratio after irradiation with ultraviolet light in comparison with the composition in Comparative Example 1. Therefore, the liquid crystal composition of the invention can be concluded to have further excellent characteristics.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A liquid crystal composition of the invention satisfies at least one of characteristics such as a high maximum temperature, a low minimum temperature, a small viscosity, a suitable optical anisotropy, a large negative dielectric anisotropy, a large specific resistance, a high stability to ultraviolet light and a high stability to heat, or has a suitable balance regarding at least two of the characteristics. A liquid crystal display device including the composition has characteristics such as a short response time, a large voltage holding ratio, a low threshold voltage, a large contrast ratio and a long service life, and therefore can be used for a liquid crystal projector, a liquid crystal television and so forth.

What is claimed is:

1. A liquid crystal composition that has a negative dielectric anisotropy and a nematic phase, and contains at least one compound selected from the group consisting of compounds represented by formula (1):

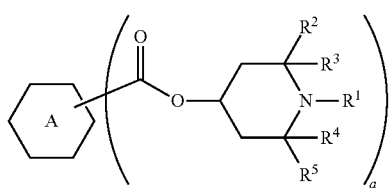

(1)

wherein, in formula (1), $R^1$ is hydrogen or alkyl having 1 to 15 carbons; $R^2$, $R^3$, $R^4$ and $R^5$ are independently hydrogen or alkyl having 1 to 4 carbons; ring A is phenyl or cyclohexyl; and a is 3 or 4.

2. The liquid crystal composition according to claim 1, containing at least one compound selected from the group consisting of compounds represented by formula (1-1) and formula (1-2):

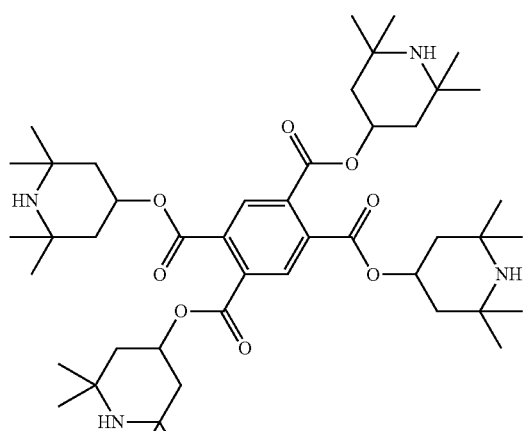

(1-1)

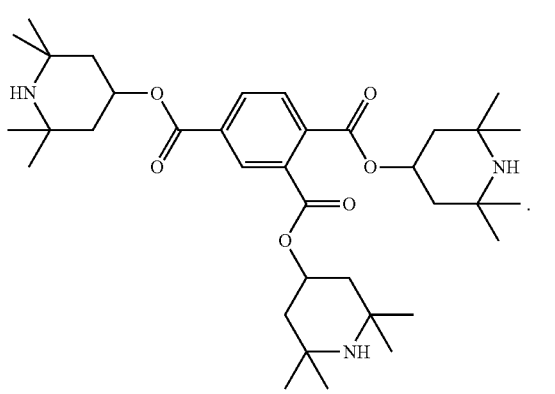

(1-2)

3. The liquid crystal composition according to claim 1, wherein a ratio of the compound represented by formula (1) is in the range of 0.005% by weight to 1% by weight based on the weight of the liquid crystal composition.

4. The liquid crystal composition according to claim 1, containing at least one compound selected from the group consisting of compounds represented by formula (2) as a first component:

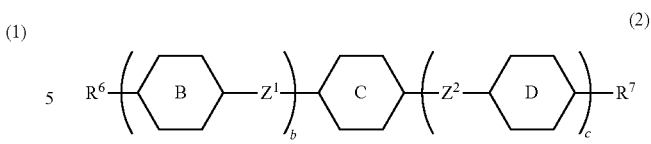

(2)

wherein, in formula (2), $R^6$ and $R^7$ are independently alkyl having 1 to 12 carbons, alkoxy having 1 to 12 carbons, alkenyl having 2 to 12 carbons or alkenyloxy having 2 to 12 carbons; ring B and ring D are independently 1,4-cyclohexylene, 1,4-cyclohexenylene, 1,4-phenylene, 1,4-phenylene in which at least one of hydrogen is replaced by fluorine or chlorine, or tetrahydropyran-2,5-diyl; ring C is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^1$ and $Z^2$ are independently a single bond, ethylene, methyleneoxy or carbonyloxy; b is 1, 2 or 3 and c is 0 or 1; and a sum of b and c is 3 or less.

5. The liquid crystal composition according to claim 4, containing at least one compound selected from the group consisting of compounds represented by formula (2-1) to formula (2-21) as a first component:

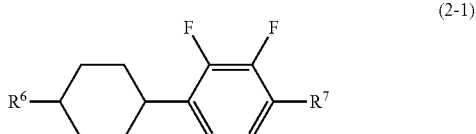

(2-1)

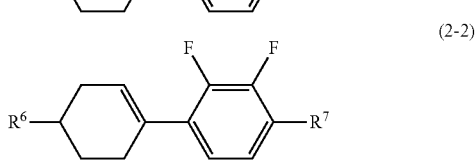

(2-2)

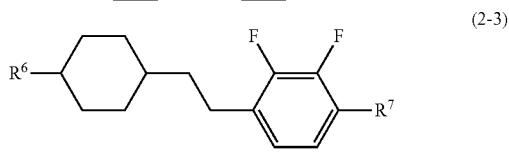

(2-3)

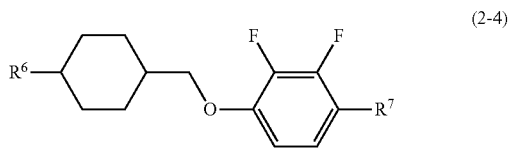

(2-4)

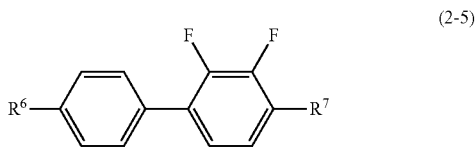

(2-5)

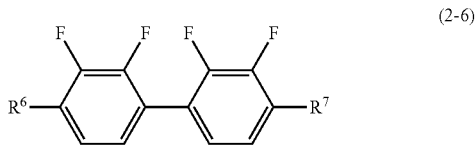

(2-6)

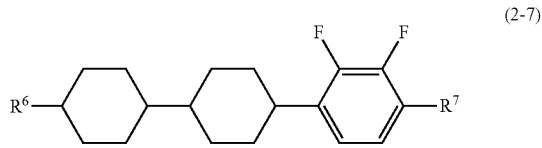

(2-7)

(2-8) 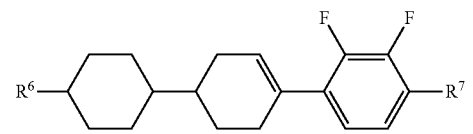

(2-9) 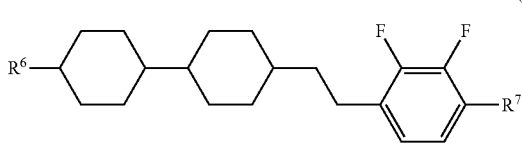

(2-10) 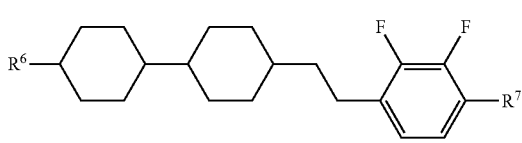

(2-11) 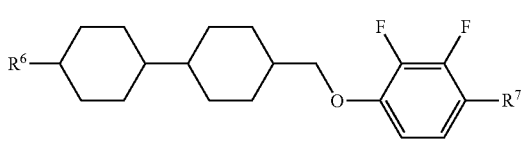

(2-12) 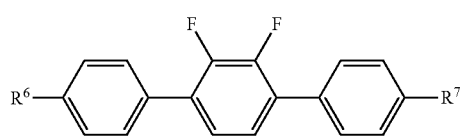

(2-13) 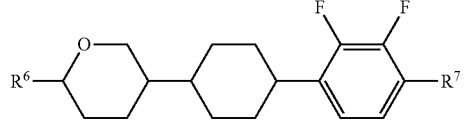

(2-14) 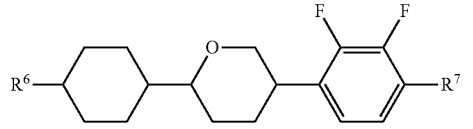

(2-15) 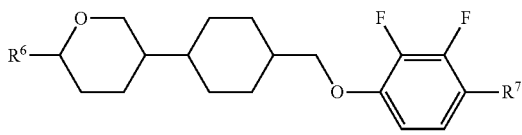

(2-16) 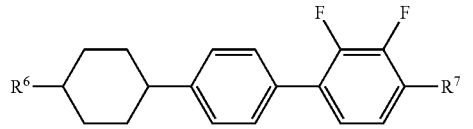

(2-17) 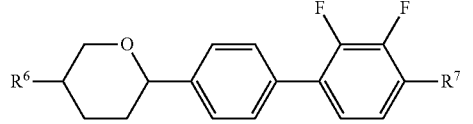

(2-18) 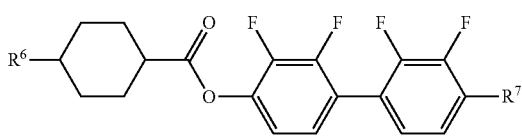

(2-19) 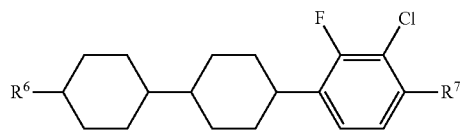

(2-20) 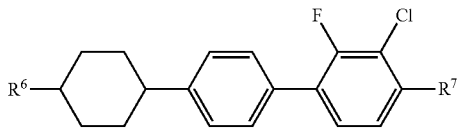

(2-21) 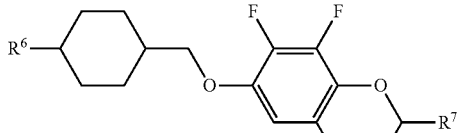

wherein, in formula (2-1) to formula (2-21), $R^6$ and $R^7$ are independently alkyl having 1 to 12 carbons, alkoxy having 1 to 12 carbons, alkenyl having 2 to 12 carbons or alkenyloxy having 2 to 12 carbons.

6. The liquid crystal composition according to claim 4, wherein a ratio of the first component is in the range of 10% by weight to 90% by weight based on the weight of the liquid crystal composition.

7. The liquid crystal composition according to claim 1, containing at least one compound selected from the group consisting of compounds represented by formula (3) as a second component:

(3) 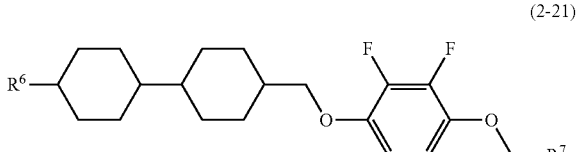

wherein, in formula (3), $R^8$ and $R^9$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring E and ring F are independently 1,4-cyclohexylene, 1,4-phenylene, 2-fluoro-1,4-phenylene or 2,5-difluoro-1,4-phenylene; $Z^3$ is a single bond, ethylene or carbonyloxy; and d is 1, 2 or 3.

8. The liquid crystal composition according to claim 7, containing at least one compound selected from the group consisting of compounds represented by formula (3-1) to formula (3-13) as the second component:

(3-1)

(3-2)

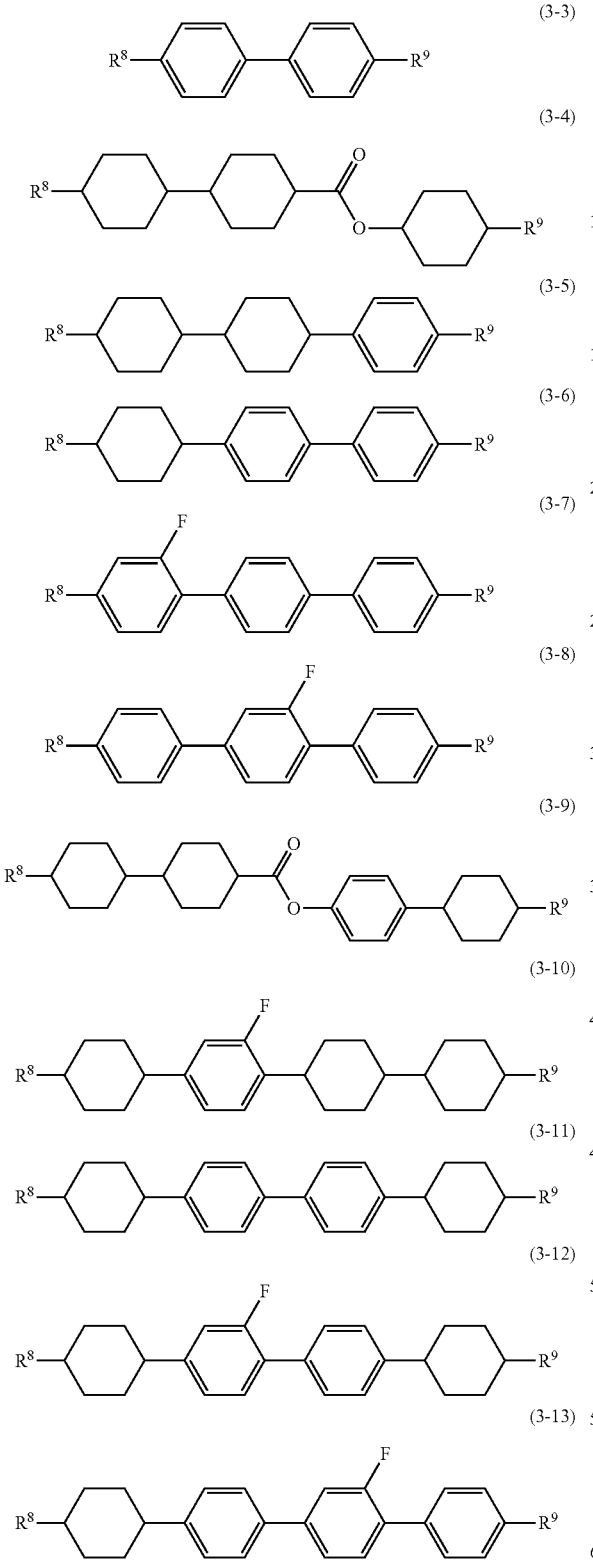

wherein, in formula (3-1) to formula (3-13), $R^8$ and $R^9$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

9. The liquid crystal composition according to claim 7, wherein a ratio of the second component is in the range of 10% by weight to 90% by weight based on the weight of the liquid crystal composition.

10. The liquid crystal composition according to claim 4, containing at least one compound selected from the group consisting of compounds represented by formula (3) as a second component:

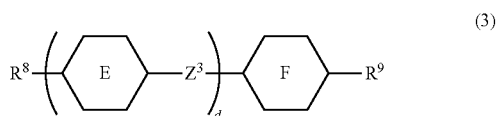

wherein, in formula (3), $R^8$ and $R^9$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring E and ring F are independently 1,4-cyclohexylene, 1,4-phenylene, 2-fluoro-1,4-phenylene or 2,5-difluoro-1,4-phenylene; $Z^3$ is a single bond, ethylene or carbonyloxy; and d is 1, 2 or 3.

11. The liquid crystal composition according to claim 1, containing at least one polymerizable compound selected from the group consisting of compounds represented by formula (4):

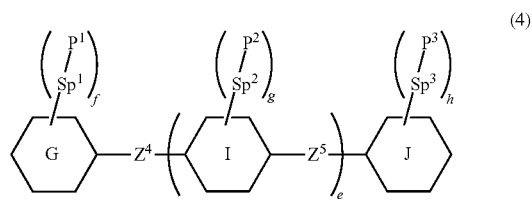

wherein, in formula (4), ring G and ring J are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one of hydrogen may be replaced by halogen, alkyl having 1 to 12 carbons, alkoxy having 1 to 12 carbons, or alkyl having 1 to 12 carbons in which at least one of hydrogen is replaced by halogen; ring I is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one of hydrogen may be replaced by halogen, alkyl having 1 to 12 carbons, alkoxy having 1 to 12 carbons, or alkyl having 1 to 12 carbons in which at least one of hydrogen is replaced by halogen; $Z^4$ and $Z^5$ are independently a single bond or alkylene having 1 to 10 carbons, and in the alkylene, at least one of —CH$_2$— may be replaced by —O—, —CO—, —COO— or —OCO—, at least one of —CH$_2$—CH$_2$— may be replaced by —CH=CH—, —C(CH$_3$)=CH—, —CH=C(CH$_3$)— or —C(CH$_3$)=C(CH$_3$)—, and in the groups, at least one of hydrogen may be replaced by fluorine or chlorine; $P^1$, $P^2$ and $P^3$ are independently a polymerizable group; Sp$^1$, Sp$^2$ and Sp$^3$ are independently a single bond or alkylene having 1 to 10 carbons, and in the alkylene, at least one of —CH$_2$— may be replaced by —O—, —COO—, —OCO— or —OCOO—, at least one of —CH$_2$—CH$_2$— may be replaced by —CH═CH— or —C≡O—, and in the groups, at least one of hydrogen may be replaced by fluorine or chlorine; e is 0, 1 or 2; f, g and h are independently 0, 1, 2, 3 or 4; and a sum of f, g and h is 1 or more.

12. The liquid crystal composition according to claim 11, wherein, in formula (4), P$^1$, P$^2$ and P$^3$ are independently a polymerizable group selected from the group consisting of groups represented by formula (P-1) to formula (P-6)

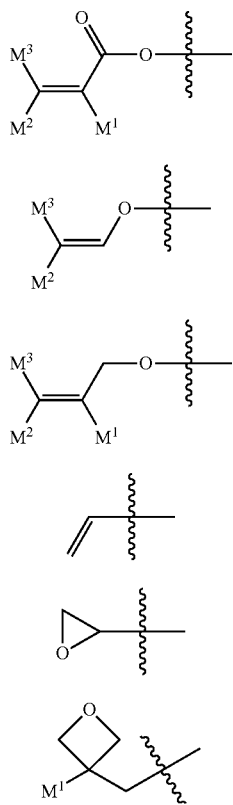

(P-1)

(P-2)

(P-3)

(P-4)

(P-5)

(P-6)

wherein, in formula (P-1) to formula (P-6), M$^1$, M$^2$ and M$^3$ are independently hydrogen, fluorine, alkyl having 1 to 5 carbons, or alkyl having 1 to 5 carbons in which at least one of hydrogen is replaced by halogen; when all of f pieces of P$^1$ and h pieces of P$^3$ are a group represented by formula (P-4), in formula (4), at least one of f pieces of Sp$^1$ and h pieces of Sp$^3$ is alkylene in which at least one of —CH$_2$— is replaced by —O—, —COO—, —OCO— or —OCOO—.

13. The liquid crystal composition according to claim 11, containing at least one polymerizable compound selected from the group consisting of compounds represented by formula (4-1) to formula (4-27):

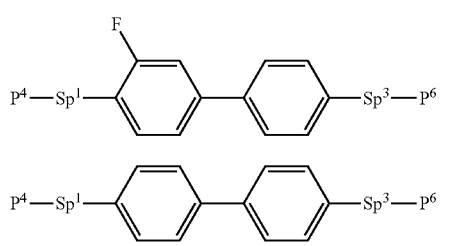

(4-1)

(4-2)

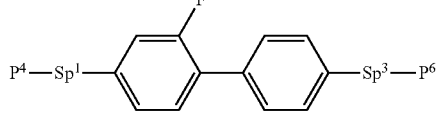

(4-3)

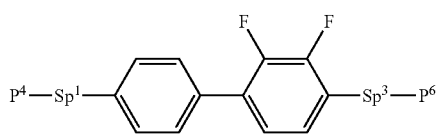

(4-4)

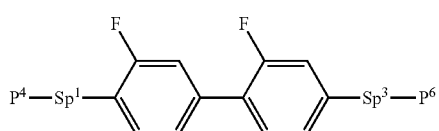

(4-5)

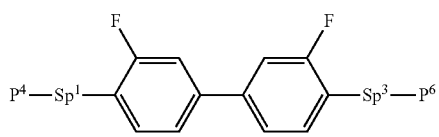

(4-6)

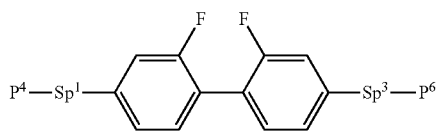

(4-7)

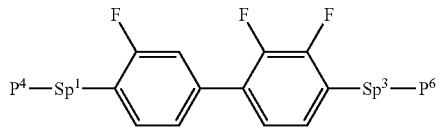

(4-8)

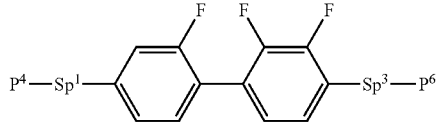

(4-9)

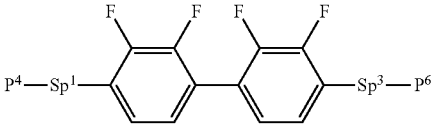

(4-10)

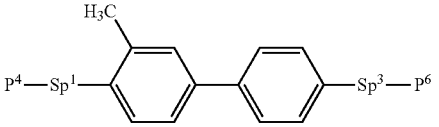

(4-11)

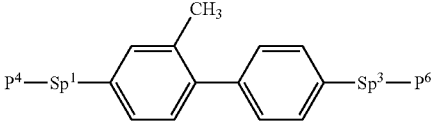

(4-12)

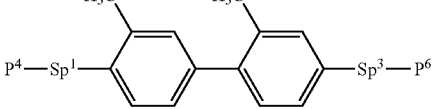

(4-13)

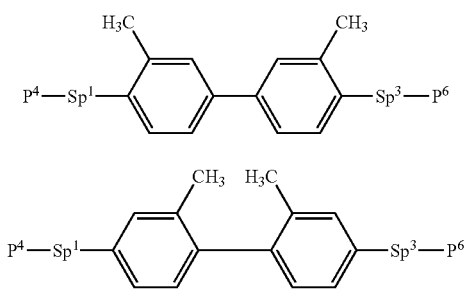
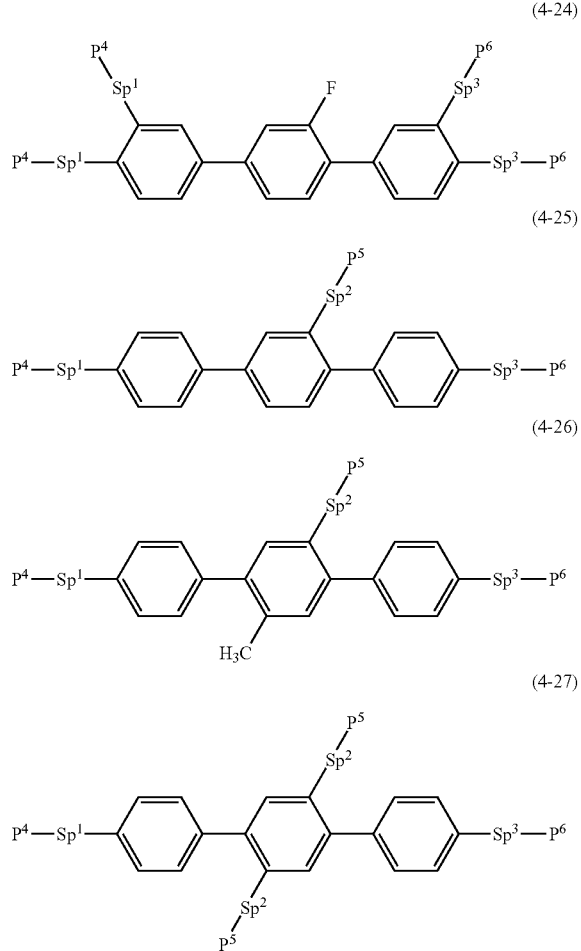

wherein, in formula (4-1) to formula (4-27), $P^4$, $P^5$ and $P^6$ are independently a polymerizable group selected from the group consisting of groups represented by formula (P-1) to formula (P-3);

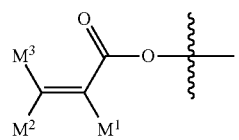

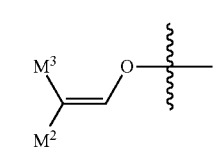

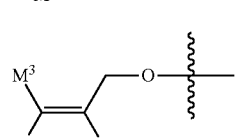

wherein, in formula (P-1) to formula (P-3), $M^1$, $M^2$ and $M^3$ are independently hydrogen, fluorine, alkyl having 1 to 5 carbons, or alkyl having 1 to 5 carbons in which at least one of hydrogen is replaced by halogen; in formula (4-1) to formula (4-27), $Sp^1$, $Sp^2$ and $Sp^3$ are independently a single bond or alkylene having 1 to 10 carbons, and in the alkylene, at least one of —$CH_2$— may be replaced by —O—, —COO—, —OCO— or —OCOO—, at least one of —$CH_2$—$CH_2$— may be replaced by —CH=CH— or —C≡C—, and in the groups, at least one of hydrogen may be replaced by fluorine or chlorine.

14. The liquid crystal composition according to claim 11, wherein a ratio of the compound represented by formula (4) is in the range of 0.03% by weight to 10% by weight based on the weight of the liquid crystal composition.

15. The liquid crystal composition according to claim 4, containing at least one polymerizable compound selected from the group consisting of compounds represented by formula (4):

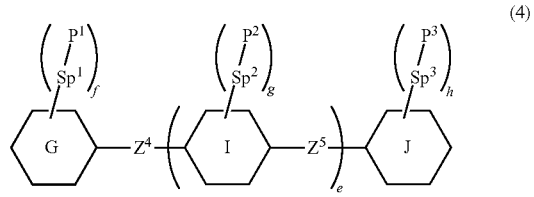

(4)

wherein, in formula (4), ring G and ring J are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one of hydrogen may be replaced by halogen, alkyl having 1 to 12 carbons, alkoxy having 1 to 12 carbons, or alkyl having 1 to 12 carbons in which at least one of hydrogen is replaced by halogen; ring I is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one of hydrogen may be replaced by halogen, alkyl having 1 to 12 carbons, alkoxy having 1 to 12 carbons, or alkyl having 1 to 12 carbons in which at least one of hydrogen is replaced by halogen; $Z^4$ and $Z^5$ are independently a single bond or alkylene having 1 to 10 carbons, and in the alkylene, at least one of —$CH_2$— may be replaced by —O—, —CO—, —COO— or —OCO—, at least one of —$CH_2$—$CH_2$— may be replaced by —CH=CH—, —C($CH_3$)=CH—, —CH=C($CH_3$)— or —C($CH_3$)=C($CH_3$)—, and in the groups, at least one of hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one of —$CH_2$— may be replaced by —O—, —COO—, —OCO— or —OCOO—, at least one of —$CH_2$—$CH_2$— may be replaced by —CH=CH— or —C=O—, and in the groups, at least one of hydrogen may be replaced by fluorine or chlorine; e is 0, 1 or 2; f, g and h are independently 0, 1, 2, 3 or 4; and a sum of f, g and h is 1 or more.

16. The liquid crystal composition according to claim 7, containing at least one polymerizable compound selected from the group consisting of compounds represented by formula (4):

(4)

wherein, in formula (4), ring G and ring J are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one of hydrogen may be replaced by halogen, alkyl having 1 to 12 carbons, alkoxy having 1 to 12 carbons, or alkyl having 1 to 12 carbons in which at least one of hydrogen is replaced by halogen; ring I is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one of hydrogen may be replaced by halogen, alkyl having 1 to 12 carbons, alkoxy having 1 to 12 carbons, or alkyl having 1 to 12 carbons in which at least one of hydrogen is replaced by halogen; $Z^4$ and $Z^5$ are independently a single bond or alkylene having 1 to 10 carbons, and in the alkylene, at least one of —$CH_2$— may be replaced by —O—, —CO—, —COO— or —OCO—, at least one of —$CH_2$—$CH_2$— may be replaced by —CH=CH—, —C($CH_3$)=CH—, —CH=C($CH_3$)— or —C($CH_3$)=C($CH_3$)—, and in the groups, at least one of hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one of —$CH_2$— may be replaced by —O—, —COO—, —OCO— or —OCOO—, at least one of —$CH_2$—$CH_2$— may be replaced by —CH=CH— or —C≡C—, and in the groups, at least one of hydrogen may be replaced by fluorine or chlorine; e is 0, 1 or 2; f, g and h are independently 0, 1, 2, 3 or 4; and a sum of f, g and h is 1 or more.

17. A liquid crystal display device, including the liquid crystal composition according to claim 1.

18. The liquid crystal display device according to claim 17, wherein an operating mode in the liquid crystal display device includes an IPS mode, a VA mode, an FFS mode or an FPA mode, and a driving mode in the liquid crystal display device includes an active matrix mode.

19. A liquid crystal display device having a polymer sustained alignment mode, including the liquid crystal composition according to claim 11, wherein the polymerizable compound in the liquid crystal composition is polymerized.

* * * * *